(12) United States Patent
El-Siblani et al.

(10) Patent No.: US 11,220,054 B2
(45) Date of Patent: Jan. 11, 2022

(54) METHOD OF STABILIZING A PHOTOHARDENING INHIBITOR-PERMEABLE FILM IN THE MANUFACTURE OF THREE-DIMENSIONAL OBJECTS

(71) Applicant: Global Filtration Systems, Dearborn Heights, MI (US)

(72) Inventors: Ali El-Siblani, Dearborn Heights, MI (US); Alexandr Shkolnik, Los Angeles, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 244 days.

(21) Appl. No.: 16/417,027

(22) Filed: May 20, 2019

(65) Prior Publication Data

US 2019/0270243 A1  Sep. 5, 2019

Related U.S. Application Data

(63) Continuation-in-part of application No. 15/958,161, filed on Apr. 20, 2018, now Pat. No. 10,335,997.
(Continued)

(51) Int. Cl.
*B29C 64/291* (2017.01)
*B29C 64/124* (2017.01)
(Continued)

(52) U.S. Cl.
CPC .......... *B29C 64/291* (2017.08); *B29C 64/124* (2017.08); *B29C 64/135* (2017.08);
(Continued)

(58) Field of Classification Search
CPC ... B29C 64/124; B29C 64/129; B29C 64/135; B29C 64/25; B29C 64/255; B29C 64/291
See application file for complete search history.

(56) References Cited

U.S. PATENT DOCUMENTS 5,122,441 A   6/1992   Lawton et al.
5,391,072 A   2/1995   Lawton et al.
(Continued)

FOREIGN PATENT DOCUMENTS

CN    106273516 A    1/2017
WO    2016115236 A1  7/2016

OTHER PUBLICATIONS

European Patent Office Partial Search Report for EP App. No. 18 864 224 dated May 4, 2021.
(Continued)

*Primary Examiner* — Atul P. Khare
(74) *Attorney, Agent, or Firm* — Hansen IP Law PLLC

(57) ABSTRACT

A method and apparatus for making a three-dimensional object by solidifying a photohardenable material are shown and described. A photohardening inhibitor is admitted into a surface of a photohardenable material through a flexible film to create a "non-solidification zone" where little or no solidification occurs. The non-solidification zone prevents the exposed surface of the photohardenable material from solidifying in contact with the film. The inhibitor tends to cause the film to deform along the build axis, thereby creating a non-planar interface between the photohardenable material and the film, which distorts the resulting three-dimensional object. An apparatus is provided to stabilize the flexible film and eliminate or minimize such deformation.

30 Claims, 14 Drawing Sheets

Related U.S. Application Data which is a continuation of application No. 15/729,050, filed on Oct. 10, 2017, now Pat. No. 10,414,090, which is a continuation-in-part of application No. 15/722,540, filed on Oct. 2, 2017, now abandoned.

(51) Int. Cl.
| | |
|---|---|
| *B33Y 30/00* | (2015.01) |
| *B29C 64/255* | (2017.01) |
| *B29C 64/135* | (2017.01) |
| *B33Y 70/00* | (2020.01) |
| *B33Y 10/00* | (2015.01) |
| *B29C 64/129* | (2017.01) |
| *B29K 105/00* | (2006.01) |
| *B29C 64/165* | (2017.01) |

(52) U.S. Cl.
CPC ............ *B29C 64/255* (2017.08); *B33Y 10/00* (2014.12); *B33Y 30/00* (2014.12); *B33Y 70/00* (2014.12); *B29C 64/165* (2017.08); *B29K 2105/0058* (2013.01); *B29K 2883/00* (2013.01)

(56) References Cited

U.S. PATENT DOCUMENTS

| | | | | |
|---|---|---|---|---|
| 5,545,367 | A * | 8/1996 | Bae | B33Y 50/02 264/401 |
| 9,211,678 | B2 * | 12/2015 | DeSimone | B29C 64/40 |
| 9,486,964 | B2 * | 11/2016 | Joyce | B29C 64/135 |
| 9,498,920 | B2 | 11/2016 | DeSimone et al. | |
| 9,975,295 | B2 * | 5/2018 | Rolland | B33Y 10/00 |
| 2001/0042471 | A1 | 11/2001 | Randazzo | |
| 2010/0262272 | A1 | 10/2010 | Shkolnik et al. | |
| 2013/0140741 | A1 | 6/2013 | El-Siblani et al. | |
| 2013/0292862 | A1 | 11/2013 | Joyce | |
| 2014/0361463 | A1 * | 12/2014 | DeSimone | B33Y 50/02 264/401 |
| 2015/0072293 | A1 | 3/2015 | DeSimone et al. | |
| 2016/0067921 | A1 | 3/2016 | Willis et al. | |
| 2016/0137839 | A1 | 5/2016 | Rolland et al. | |
| 2016/0160077 | A1 | 6/2016 | Rolland et al. | |
| 2016/0167301 | A1 | 6/2016 | Cole et al. | |
| 2016/0200052 | A1 * | 7/2016 | Moore | B29C 64/245 264/401 |
| 2016/0303795 | A1 | 10/2016 | Liu et al. | |
| 2017/0151718 | A1 | 6/2017 | Rolland et al. | |
| 2019/0099947 | A1 | 4/2019 | El-Siblani et al. | |

OTHER PUBLICATIONS

European Patent Office Office Action for EP App. No. 18 864 224 dated May 14, 2021.
English translation of CN106273516.
International Search Report and Written Opinion for PCT/US2018/050670 dated Nov. 28, 2018.
International Search Report and Written Opinion dated Sep. 30, 2020.

* cited by examiner

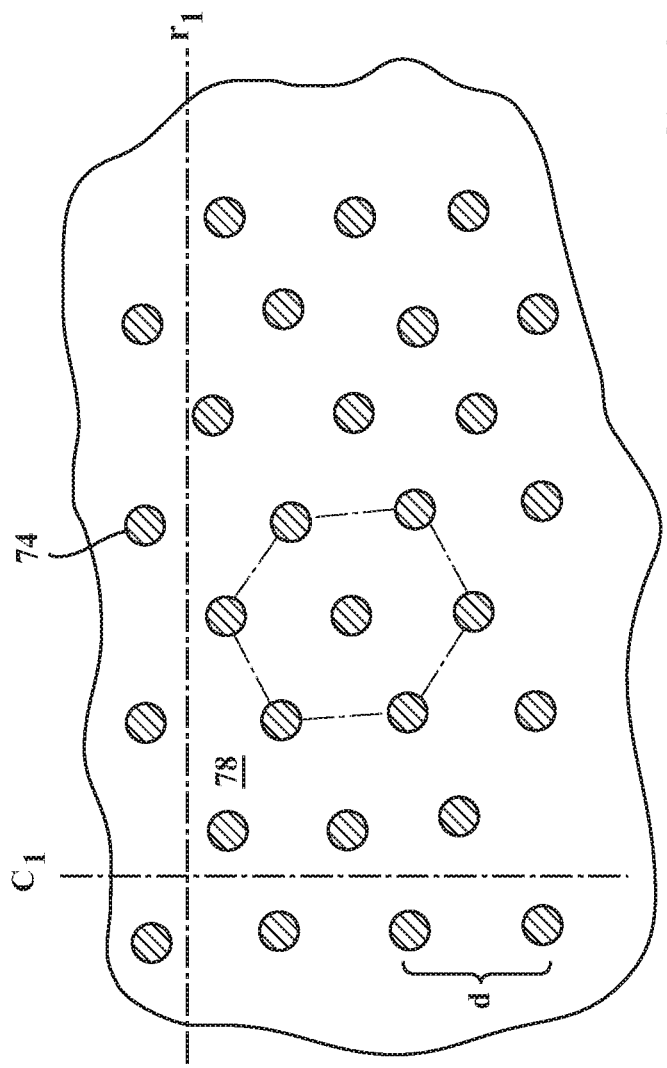

METHOD OF STABILIZING A PHOTOHARDENING INHIBITOR-PERMEABLE FILM IN THE MANUFACTURE OF THREE-DIMENSIONAL OBJECTS

CROSS-REFERENCE TO RELATED APPLICATIONS

This application is a continuation-in-part of U.S. patent application Ser. No. 15/958,161, filed on Apr. 20, 2018, which is a continuation of U.S. patent application Ser. No. 15/729,050, filed on Oct. 10, 2017, which is a continuation-in-part of U.S. patent application Ser. No. 15/722,540, filed on Oct. 2, 2017, the entirety of each of which is hereby incorporated by reference.

FIELD

The disclosure relates to a system and method for manufacturing three-dimensional objects, and more specifically, to a system and method of stabilizing a film that is permeable to a photohardening inhibitor to minimize its deformation. Such deformation is undesirable as it tends to distort the planarity of the photohardenable material/film interface and yield inaccurate objects.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, solidification energy source comprising a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

In certain three-dimensional object manufacturing processes, it is important to ensure that the solidifiable material (e.g., polymeric resin) used to make the object forms a smooth and substantially planar surface to which solidification energy from a pattern generator will be applied. One technique uses an "upside down" build process in which an object is built progressively in the downward build (z) axis direction (toward the earth) as the build platform is progressively elevated in the upward build (z) axis direction. A basin holding the solidifiable material, such as a photohardenable material, has a transparent bottom through which solidification energy is projected to solidify the photohardenable material in patterns corresponding to cross-sections of the three-dimensional object. The exposed, or energy-incident, surface of the photo hardenable material is in contact with the bottom of the basin. However, because the solidification energy is incident at the bottom of the basin, photohardenable material solidifies in contact with the basin and must be separated without damaging the object.

Certain known methods involve the creation of a "dead zone"—where no solidification occurs—in a thin region at the interface between the photohardenable material and a photohardening inhibitor-permeable film that defines the bottom of the basin. These methods avoid the need for a means to separate the solidified object from the bottom of the basin. The methods typically involve feeding a photohardening inhibitor through the film. The inhibitor typically reacts with or consumes a photohardening initiator such that polymerization and/or crosslinking cannot occur within the dead zone. The inhibitor is fed at a rate that affects the build (z) axis thickness of the dead zone. Because no separation step is required, some of the methods move the build platform continuously upward along the build axis to accelerate the build process. However, in some cases, the influx of the inhibitor deforms the inhibitor-permeable film, which disrupts the planarity of the interface between the film and the photohardening material. The data used to drive the photohardening process is generated based on a planar interface. The distortion of the film planarity may cause inaccuracies in the resulting objects relative to the data that defines them. Thus, a need has arisen for a system and method of making three-dimensional objects which addresses the foregoing issues.

BRIEF DESCRIPTION OF THE DRAWINGS

The disclosure will now be described, by way of example, with reference to the accompanying drawings, in which:

FIG. 4 is a top plan view of the supports of the photohardening inhibitor reservoir of FIG. 3B;

DETAILED DESCRIPTION

Figure 1:
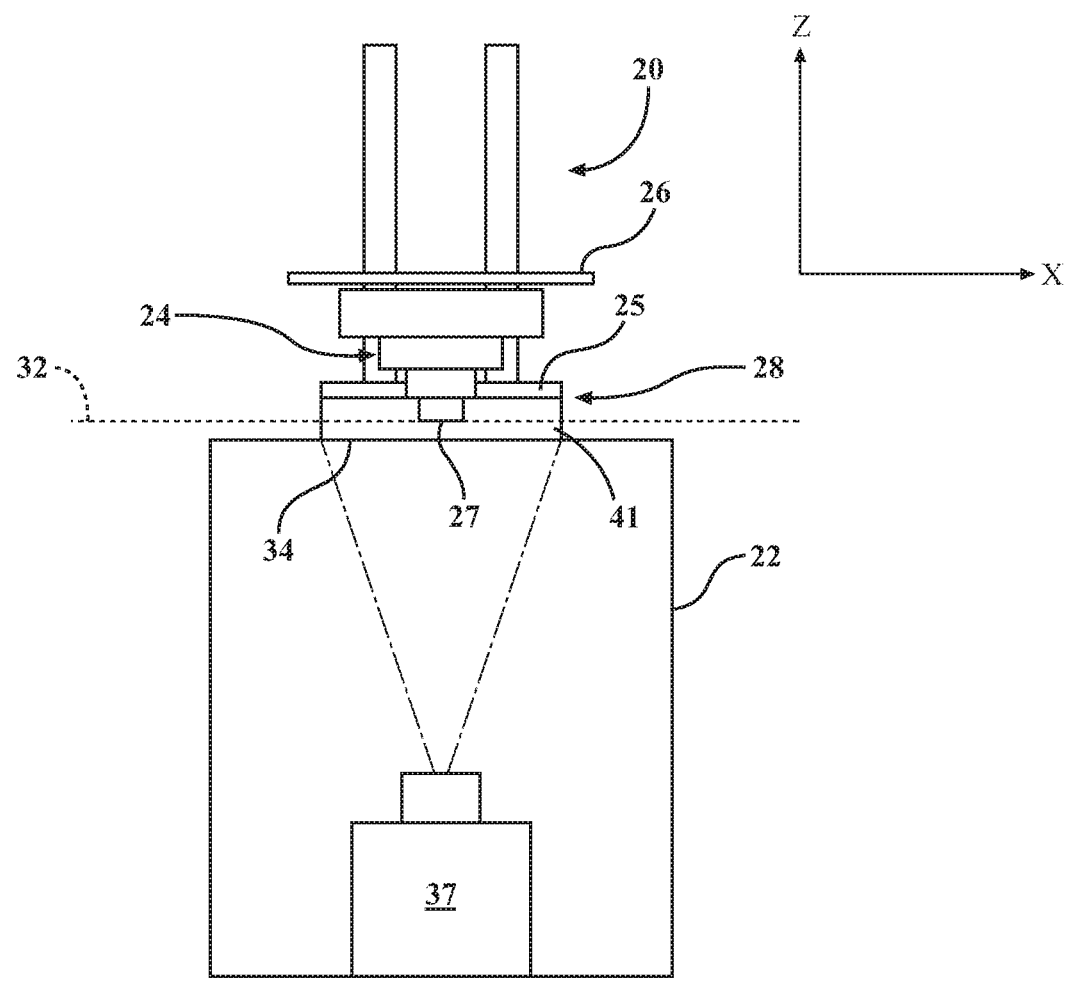
FIG. 1 is a side elevational, cross-sectional view of system for making a three-dimensional object from a solidifiable material in accordance with the present disclosure.

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art.

The system and methods described herein are generally applicable to additive manufacturing of three-dimensional objects, such as components or parts (discussed herein generally as objects), but may be used beyond that scope for alternative applications. The system and methods generally involve creating a "dead zone" of non-solidification in a photohardenable material to prevent the material from solidifying against a surface of a photohardenable material container. The dead zone is created by using a photohardening inhibitor permeable film that defines the surface of the photohardenable material upon which the photohardening energy is incident ("energy-incident surface"). The inhibitor reacts with a photoinitiator upon entering the volume of photohardenable material at its interface with the inhibitor permeable film and prevents photohardening in a region proximate the film. That region is the dead zone or "non-solidification zone". Exemplary photoinhibitors suitable for certain photohardenable liquids or resins described herein include air, oxygen, and oxygen-enriched air (i.e., mixtures of nitrogen and oxygen with greater than 21 mole percent oxygen). If it is secured at its perimeter, as the air and oxygen are fed through the inhibitor permeable film, the film tends to deform in the direction of inhibitor flow, causing the film to assume a shape that is similar to a dome. This deformation creates a non-planar interface between the photohardenable material and the film, which can cause the resulting three-dimensional objects to deviate from the computer data that originally defined them. In general, when air or other mixtures comprising oxygen and a non-inhibiting compound, it is preferable to maximize the concentration of oxygen to increase its rate of diffusion across the film, which is believed to be dependent on the oxygen concentration gradient across the film.

In accordance with a first aspect of the present disclosure, a photohardening inhibitor delivery device is provided which comprises a photohardening inhibitor reservoir that comprises an inlet channel in fluid communication with a continuous chamber, the continuous chamber having an open top. The device also includes a flexible film that is permeable to the photohardening inhibitor and attached to the photohardening inhibitor reservoir, the flexible film having a first side that faces the continuous chamber, and a second side that faces away from the continuous chamber, wherein the flexible film encloses the open top of the continuous chamber. A plurality of supports are provided within the continuous chamber, wherein each support is attached to the film and the photohardening inhibitor reservoir. In certain examples, the flexible film is elastomeric. In the same or other examples, the flexible film comprises a polydimethylsiloxane (PDMS) film or a fluoropolymer.

In other examples, a method of using the apparatus is provided which comprises supplying a photohardening inhibitor through the continuous chamber and to the flexible film such that the photohardening inhibitor permeates the flexible film. A previously formed object surface is immersed into a volume of photohardenable material such that the previously formed object surface is spaced apart from the flexible film. Solidification energy is supplied in a pattern corresponding to a cross-section of the three-dimensional object through the flexible film to form a currently exposed object surface that is spaced apart from the flexible film, wherein during the step of supplying solidification energy, the photohardening inhibitor prevents the photohardenable material from solidifying within a zone of solidification that includes the film/material interface. In the same or other examples, the previously formed object surface is attached to a build platform that moves along a build axis, and during the step of supplying solidification energy, the build platform continuously moves away from the flexible film along the build axis. In certain examples, the photohardening inhibitor reservoir is attached to a rigid or semi-rigid transparent base.

In accordance with a second aspect of the present disclosure, a polydimethylsiloxane inhibitor reservoir is provided which comprises sidewalls and a bottom that define a chamber having an open top. The reservoir further comprises an inlet channel and a plurality of supports, wherein the inlet channel is in fluid communication with the chamber top. A polydimethylsiloxane film is attached to the supports and encloses the chamber. In certain examples, the chamber is continuous. In additional examples, the polydimethylsiloxane inhibitor reservoir is attached to a transparent base.

In accordance with a third aspect of the present disclosure, a photohardening inhibitor delivery device is provided which comprises a photohardening inhibitor reservoir and at least one film including a flexible film. The photohardening inhibitor reservoir comprises an inlet channel in fluid communication with a continuous chamber, the continuous chamber has an open top and a plurality of supports, and each support has a height and a cross-sectional area, wherein a ratio of the height to the cross-sectional area is no more than $0.2\mu^{-1}$, preferably no more than $0.15\mu^{-1}$, and still more preferably no more than $0.1\mu^{-1}$. In the same or other examples, the ratio of the support heights to their cross-sectional areas is at least about $0.0005\mu^{-1}$, preferably at least about $0.0008\mu^{-1}$, and more preferably, at least about $0.001\mu^{-1}$. In the same or other examples, the (dimensionless) ratio of the support heights h to the support diameters D is no more than five (5), preferably no more than three (3), more preferably no more than two (2) and still more preferably no more than one.

In accordance with a fourth aspect of the present disclosure, a method of making a three-dimensional object by solidifying a plurality of layers of a photohardenable material is provided. The method comprises forming an initial plurality of layers and a subsequent plurality of layers, wherein each layer in the initial plurality of layers and the subsequent plurality of layers is formed by supplying a photohardening inhibitor to a surface of the photohardenable material, thereby creating a non-solidification zone from the surface to a solidification zone, wherein the surface and the solidification zone are spaced apart along a build axis. The method also comprises supplying solidification energy to the surface in a pattern corresponding to a cross-section of a three-dimensional object, thereby solidifying a portion of the photohardenable material in the solidification zone to form the layer of the three-dimensional object, wherein the layer of the three-dimensional object is attached to a build platform or a previously formed object section that is attached to the build platform. The build platform is moved away from the non-solidification zone along the build axis at a build platform speed, wherein the build platform speed is an initial build platform speed during the step of forming the initial plurality of layers and a subsequent build platform speed during the formation of a subsequent plurality of layers, and the initial build platform speed is not more than about 70 percent of the subsequent build platform speed.

In accordance with a fifth aspect of the present disclosure, an apparatus for making a three-dimensional object is provided. The apparatus comprises a photohardenable material container comprising a photohardenable material enclosure attached to a photohardening inhibitor delivery device, wherein the photohardenable material container comprises an open top defined by the photohardenable material enclosure and a closed bottom defined by the photohardening inhibitor delivery device, the closed bottom defines an energy-incident surface of the photohardenable material, the photohardening inhibitor delivery device comprises a photohardening inhibitor reservoir and at least one film, and the photohardening inhibitor chamber has an open top and a plurality of supports. The photohardening inhibitor delivery device further comprises at least one film that is permeable to the photohardening inhibitor, wherein the at least one film is attached to each of the supports in the plurality of supports and encloses the open top of the photohardening inhibitor chamber, and each support has a cross-sectional area. The apparatus also includes a build platform movable along a build axis and a solidification energy source spaced apart from the at least one film along the build axis, wherein the solidification energy source is activatable to selectively project a plurality of pixels of solidification energy onto the energy-incident surface of the photohardenable material, wherein the projected pixels each have an area, and the area of each projected pixel is less than the cross-sectional area of each of the supports.

In accordance with a sixth aspect of the present disclosure, s method of making a three-dimensional object by solidifying a photohardenable material on a build platform that is movable along a build axis is provided. The photohardenable material is contained in a container having a bottom defined by a photohardening inhibitor delivery device, and the photohardenable material has an energy-incident surface defined by the bottom of the container. The photohardening inhibitor delivery device comprises a photohardening inhibitor reservoir comprising a continuous chamber, the continuous chamber having an open top and a plurality of supports. The photohardening inhibitor delivery device further comprises at least one film including a flexible film, wherein the at least one film is permeable to the photohardening inhibitor and is attached to the photohardening inhibitor reservoir. The at least one film has a first side that faces the continuous chamber, and a second side that faces away from the continuous chamber, wherein the flexible film encloses the open top of the continuous chamber, and each support is attached to the film. The method comprises supplying the photohardening inhibitor from the continuous chamber to the photohardenable material to create a zone of non-solidification from the energy-incident surface of the photohardenable material to a distance within the volume of the photohardenable material along the build axis; supplying solidification energy to the photohardenable material to solidify a portion of the photohardenable material; and moving the build platform away from the photohardening inhibitor delivery device along the build axis at a velocity that varies with a force resisting the movement of the build platform away from the photohardening inhibitor delivery device.

In further examples, the polydimethylsiloxane inhibitor reservoir and flexible film are part of a photohardenable material container assembly. The photohardenable material container assembly includes a lower enclosure having a base that defines an enclosed opening, and the transparent base that is attached to the polydimethylsiloxane inhibitor reservoir defines the bottom of the photohardenable material container assembly. The photohardenable material container assembly also includes an upper enclosure attached to the lower enclosure, and the assembly also includes an enclosed channel that extends around the rigid or semi-rigid transparent base for supplying the photohardening inhibitor to the chamber.

The system is generally used for manufacturing three-dimensional objects from a solidifiable material and rapid prototyping. A source of solidification energy is provided and comprises a pattern generator (such as a digital light projector, laser, LCD, LED array, etc.) that provides an image to the material to selectively solidify it.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material may take on a final form (e.g., after exposure to the electromagnetic radiation) that may vary from semi-solids, solids, waxes, and crystalline solids. A photohardenable material is a material that—when subjected to electromagnetic energy of a particular intensity and for a particular duration—hardens through polymerization and/or cross-linking (curing).

When discussing a photopolymerizable, photohardenable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth) acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 Di-ketones, acylphosphine oxides, benzyldimethyl-ketals, α-amino ketones, and α-hydroxy ketones. Examples of suitable metallocenes include Bis (eta 5-2,4-cyclopenadien-1-yl) Bis [2,6-difluoro-3-(1H-pyrrol-1-yl) phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

As mentioned previously, the solidification energy source's pattern generator(s) may be configured in a number of ways. Many may provide controlled electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Referring to FIG. 1, a system 20 for making a three-dimensional object 24 from a photohardenable material 25 is depicted. System 20 is generally configured to receive data describing the shape and appearance of the object (such as CAD data) and to create a solid object 24 in conformity with the data. System 20 includes a housing 22 in which a pattern generator 37 is disposed. Pattern generator 37 projects two-dimensional solidification energy images upward along a build (z) axis and through an opening 34 in the top of housing 22. Photohardenable material 25 is a material that when subjected to electromagnetic energy of a particular intensity and for a particular duration hardens through polymerization and/or cross-linking (curing). Each image projected by pattern generator 37 corresponds to a cross-section of three-dimensional object 24. The photohardenable material 25 is held in a photohardenable material container assembly 28 with a transparent bottom. In FIG. 1, the photohardenable material container assembly 28 is represented generally without the features of the assembly as defined in FIGS. 2A-3C.

The photohardenable material container assembly 28 is positioned over opening 34 in the top of housing 22 so that electromagnetic energy (such as UV, IR or visible light) can enter the assembly 28. At least one process computer is operatively connected to the pattern generator 37 and a build platform actuator (not shown) to provide image data to the pattern generator 37 to move the build platform 26 along the build (z) axis. One of the process computers or another computer may be provided to convert image data from one format (e.g., .stl files) to another suitable for use by the pattern generator (e.g., bitmaps).

Solidification of the photohardenable material 25 occurs in a building region that begins at a build plane 32. Build plane 32 is defined by a non-solidification zone 41 which is a region into which solidification energy penetrates but in which the photohardenable material 25 does not harden. In certain examples, the zone of non-solidification or non-solidification zone 41 is created by feeding a photohardening inhibitor into the photohardenable material container assembly 28, or a portion thereof which holds the photohardenable material 25. In the same or other cases, the temperature of the non-solidification zone 41 is controlled to inhibit polymerization.

Figure 2A:
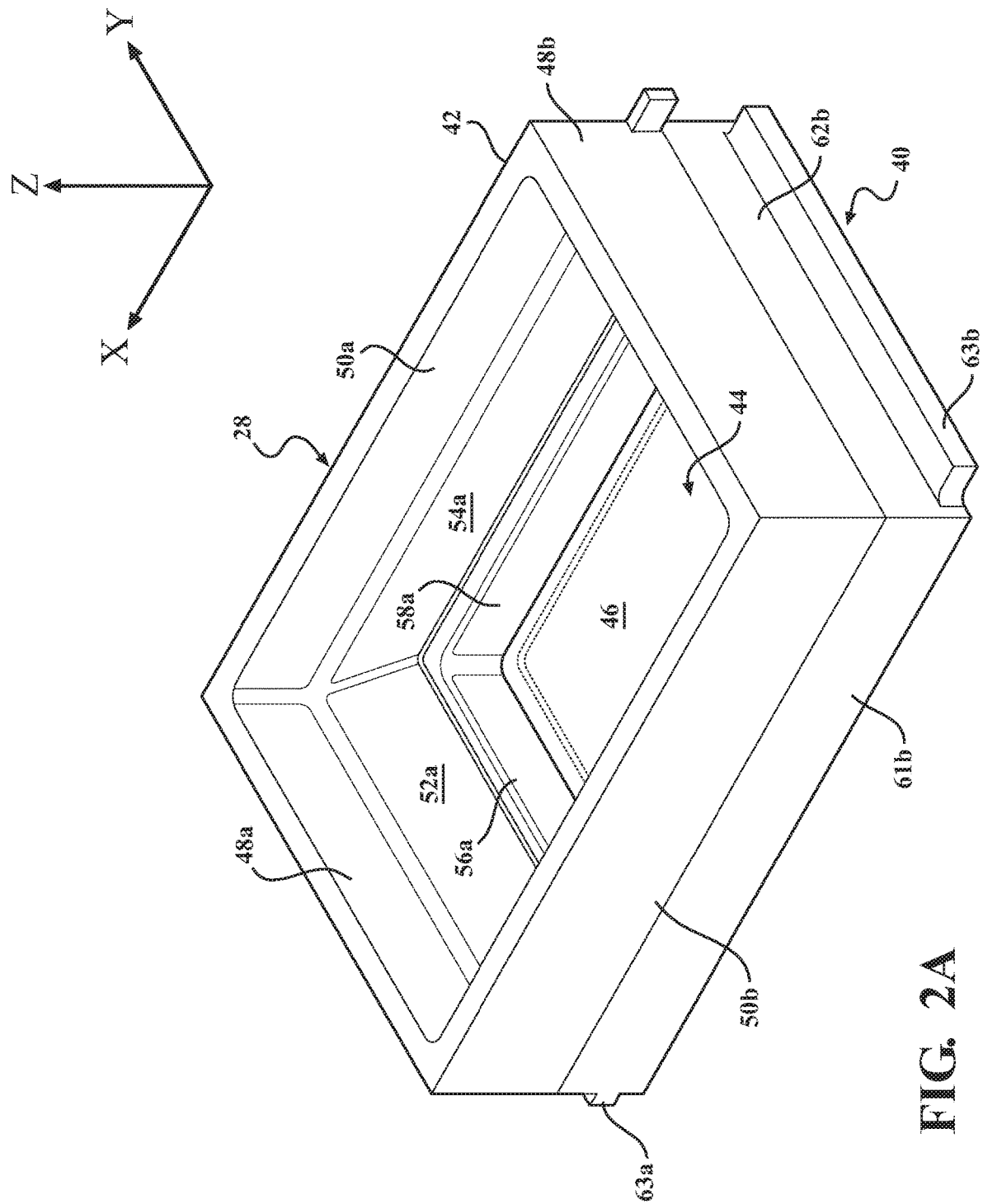
FIG. 2A is a perspective view of a first exemplary photohardenable material container assembly comprising a photohardening inhibitor delivery device that includes a stabilized photohardening inhibitor permeable film and a photohardening inhibitor reservoir.
Figure 2B:
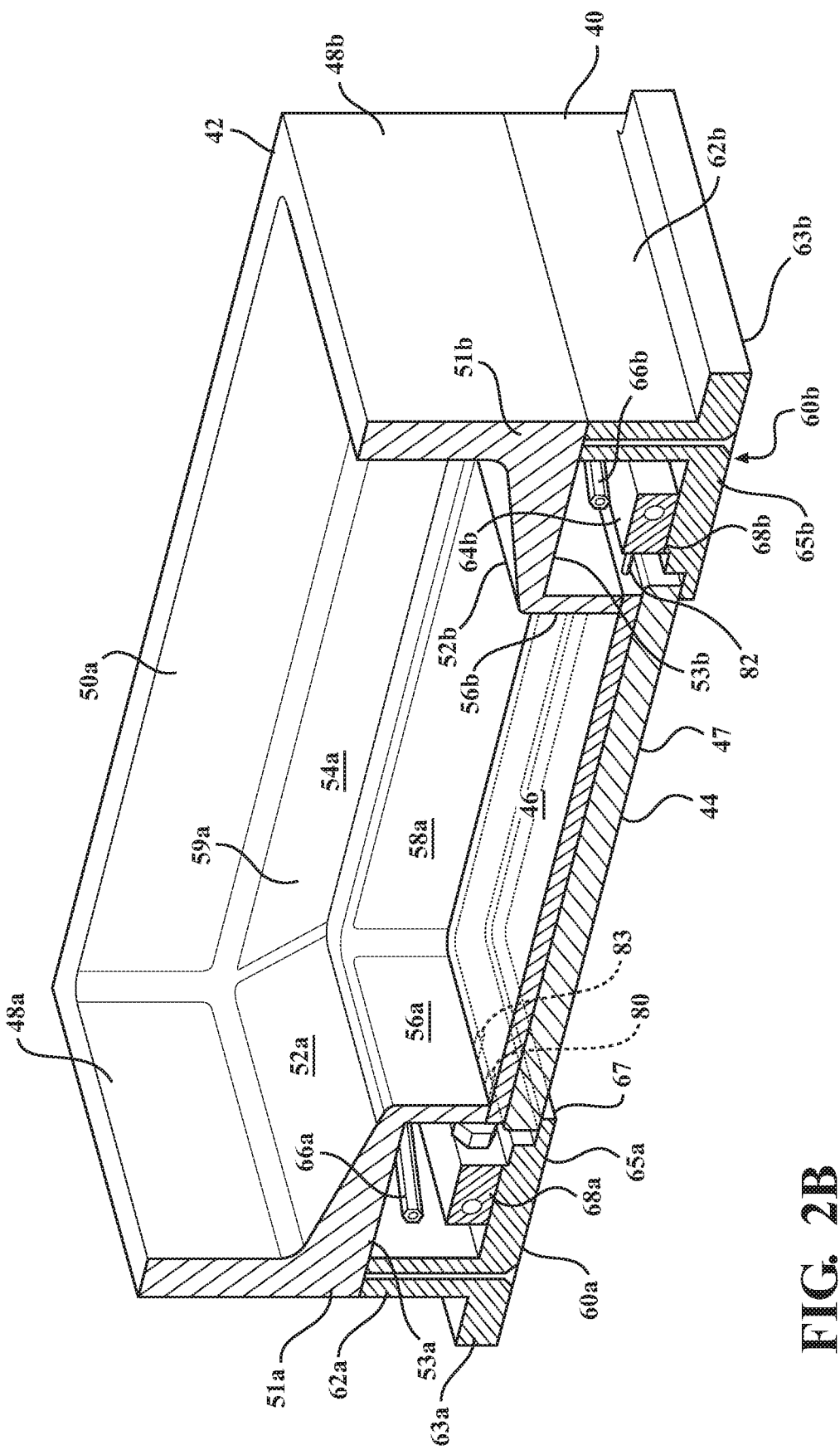
FIG. 2B is a cut-away view of the photohardenable material container assembly of FIG. 2A.

The photohardenable material container assembly 28 preferably includes at least one photohardening inhibitor permeable film 46 that is supported to provide stability and prevent deformation. One exemplary configuration is shown in FIGS. 2A-2B. Container assembly 28 includes a lower enclosure 40 and an upper enclosure 42. Each enclosure 40 and 42 is defined by a closed, continuous perimeter and a central opening. The container assembly 28 also includes a photohardening inhibitor delivery device 44 that is located in the central opening defined by lower enclosure 40. The photohardening inhibitor delivery device 44 is configured to deliver the photohardening inhibitor into the photohardenable material 25 and create non-solidification zone 41 while at the same time allowing solidification energy from pattern generator 37 to pass into the photohardenable material 25.

Figure 3A:
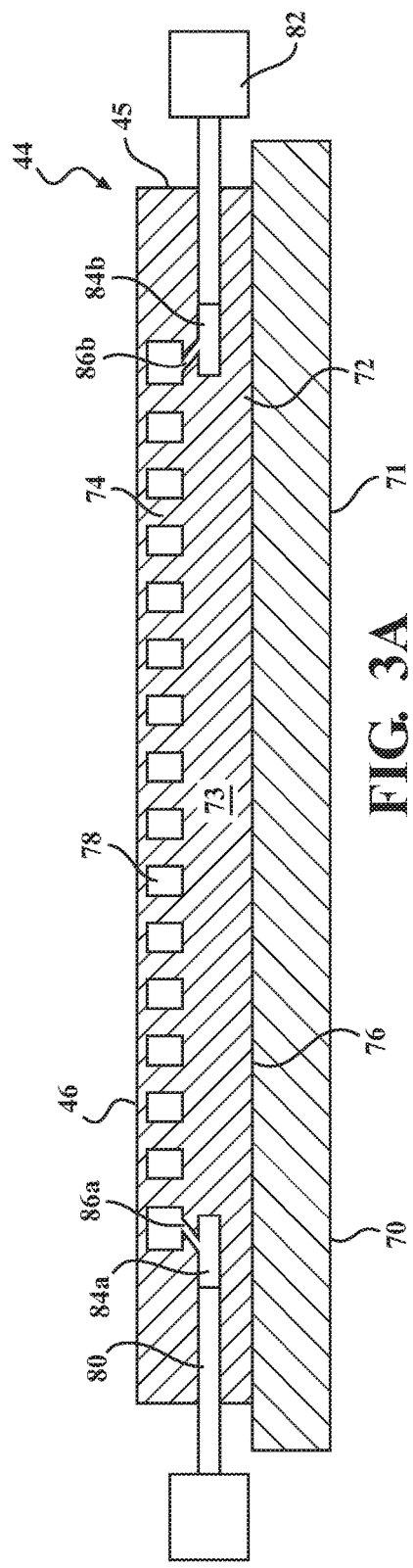
FIG. 3A is a close-up, side-elevational view of the photohardening inhibitor delivery device used in the photohardenable material container assembly of FIG. 2A.

Referring to FIG. 3A, an exemplary photohardening inhibitor delivery device 44 is depicted. The photohardening inhibitor delivery device 44 comprises a photohardening inhibitor reservoir 72, at least one photohardening inhibitor permeable film 46, and a rigid or semi-rigid transparent substrate 70. Rigid or semi-rigid transparent substrate 70 may be constructed from materials such as transparent glass or transparent acrylic polymers. The photohardening inhibitor reservoir 72 has a bottom surface 76 that is bonded to rigid or semi-rigid transparent substrate 70. In certain examples, the bottom surface 76 is surface treated to reduce its surface energy, such as through corona plasma treatment. Bottom surface 76 is then brought into contact with substrate 70 with sufficient pressure to remove air pockets and heat treated to bond reservoir 72 to substrate 70. The at least one photohardening inhibitor permeable film 46 is attached to a plurality of supports 74 (only one is called out in FIG. 3A) and is spaced apart from the rigid or semi-rigid transparent substrate 70 along the build (z) axis. The at least one film 46 is substantially parallel to the x-y plane and substantially perpendicular to the build (z) axis. The phrase "at least one film" refers to the fact that multiple films be provided so as to define a series of adjacent film layers.

Figure 3B:
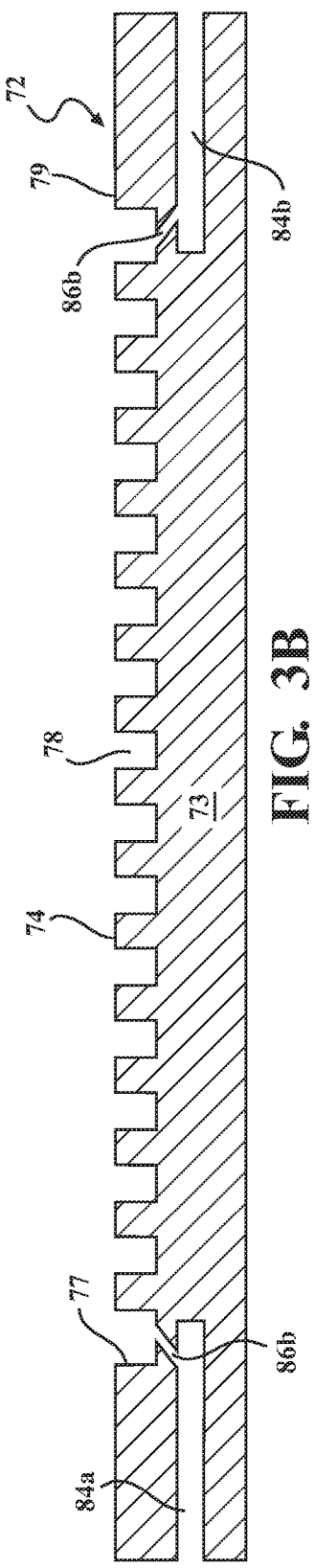
FIG. 3B is a close-up, side-elevational view of the photohardening inhibitor reservoir used in the photohardening inhibitor delivery device of FIG. 3A.
Figure 3C:
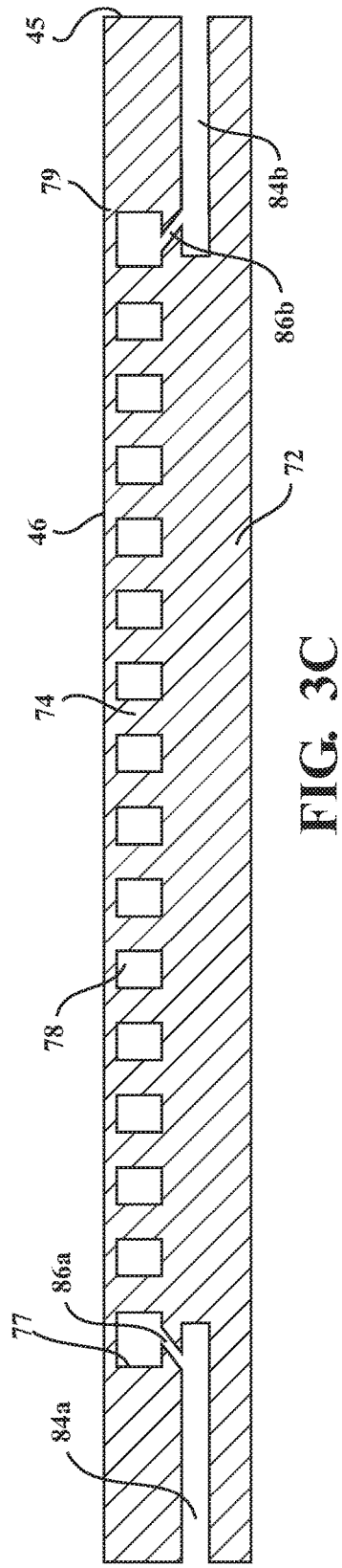
FIG. 3C is a close-up, side-elevational, view of the photohardening inhibitor reservoir and photohardening inhibitor permeable film used in the photohardening inhibitor delivery device of FIG. 3A.

The photohardening inhibitor reservoir 72 has an open top (FIG. 3B) that is preferably covered by at least one photohardening inhibitor permeable film 46. Photohardening inhibitor reservoir 72 and the at least one photohardening inhibitor permeable film 46 define an apparatus 45 for receiving and holding a volume of the photohardening inhibitor. FIG. 3B shows the reservoir 72 without the at least one film 46 attached thereto. At least one film 46 has a first side facing the continuous chamber 78 and a second side facing upward into (and in contact with) the volume of photohardenable material in container assembly 28. The reservoir 72 comprises a solid, non-rigid, polymeric body having channels 84a, 84b and conduits 86a and 86b formed therein for receiving the photohardening inhibitor and transporting it to continuous chamber 78. Supports 74 have lengths along the build (z) axis and are arranged to define a continuous chamber 78 extending along the length (x) and width (y) axes from a first length (x) axis end 77 to a second length (x) axis end 79. The chamber 78 is "continuous" in that each part of the chamber 78 is in fluid communication with every other part of the chamber 78. In the example of FIGS. 3A-3C, the reservoir 72 includes only one chamber 78. The x-y area of the build platform 26 within which the three-dimensional object 24 may be formed is known as the "build envelope," and is generally co-extensive with the x-y area of solidification energy that is incident on build plane 32, and energy-incident surface 29 of photohardenable material 25. As described below with respect to FIGS. 7-10, the build area size is a function of the focal length of the optics used with the solidification energy source and the size of the spatial light modulator (e.g., DMD micro-mirror array). In the example of FIGS. 1-3C, the area of the continuous chamber 78 is greater than the area defined by the build envelope, and in certain preferred examples, the length (x axis) dimension and the width (y axis) dimension of the continuous chamber 78 are each greater than the corresponding length (x axis) and width (y axis) dimensions of the build envelope. Providing a continuous chamber that is at least as large as the build envelope minimizes pressure and inhibitor variations or gradients across the entire build envelope, which in turn minimizes variations in the depth of the non-solidification zone 41 across the build envelope. Pattern generator 37 is in optical communication with the rigid or semi-rigid transparent substrate 70 and at least one photohardening inhibitor permeable film 46. Images transmitted from pattern generator 37 will preferably travel through substrate 70, reservoir 72, and at least one film 46 without any appreciable distortion or alteration to maximize the accuracy of the three-dimensional object relative to the data that defines it.

Photohardening inhibitor channels 84a and 84b are in fluid communication with the continuous chamber 78 and extend to the outer surface of the reservoir 72 along the length (x) axis. Channel 84a is connected to continuous chamber 78 via angled conduit 86a, and conduit 86b is connected to continuous chamber 78 via angled conduit 86b. The angled conduits 86a and 86b are angled relative to the y-z plane. Without wishing to be bound by any theory, orienting conduits 86a and 86b at an angle relative to the y-z plane is believed to reduce the vertical momentum of the incoming photohardening inhibitor which is imparted on the at least one film 46 and thereby reduces the likelihood of damaging at least one film 46. Inlet catheter 80 is in fluid communication with a source of photohardening inhibitor. Outlet catheter 82 may be in fluid communication with a volume of photohardening inhibitor or the atmosphere. If pure oxygen is used as the inhibitor, is preferable to recycle it and not simply vent it to the atmosphere. At a given photohardening inhibitor pressure in the continuous chamber 78, the pressure drop in channel 84b, outlet catheter 82b and any other system components relative to the permeability of the at least one photohardening inhibitor permeable film 46 will determine the mass flow rate of the photohardening inhibitor that passes through the at least one film 46 relative to the mass flow rate of the inhibitor that exits through outlet catheter 82b. Thus, by providing appropriate valves on the outlet side of the reservoir 72 (e.g., in the catheter 82 or components connected downstream thereof), the relative flow rates through the at least one film 46 and out of the outlet catheter 82 may be automatically adjusted. In certain examples, a supply pressure of photohardening inhibitor provided through inlet catheter 80 is controlled at a level that provides the desired flow rate of photohardening inhibitor through at least one film 46 (and/or which provides the desired non-solidification zone 41 height along the build (z) axis). In certain examples, a pressure controller with an adjustable set point may be provided. In other examples, the pressure may be fixed so that a user cannot adjust it. In other cases, an optical sensor may determine the build (z) axis height of non-solidification zone 41 and may reset the set point of a supply side pressure controller to keep the non-solidification zone 41 height at a desired value. In certain cases a controller may be provided which adjusts a valve on the outlet side of the reservoir 72 (i.e., on the outlet catheter 82 or downstream components) to maintain a desired non-solidification zone 41 height along the build (z) axis. In one example, a non-solidification zone height controller may use split range control and adjust the inhibitor supply pressure up to a maximum value and then adjust a pressure downstream of a control valve on the outlet side to maintain a desired non-solidification zone height.

The photohardening inhibitor reservoir 72 is preferably made of a material that is transparent to the solidification energy (which goes through the bottom 76 of the reservoir) and sufficiently rigid to withstand the photohardening inhibitor pressure and the weight of the photohardenable material 25 on top of at least one film 46. The reservoir 72 is also preferably substantially invulnerable to reaction or degradation from contact with the inhibitor or the photohardenable material 25. The reservoir 72 is preferably formed from a polymeric material, and more preferably from a silicone polymeric material, and still more preferably from an organo-siloxane polymer. In certain preferred examples, reservoir 72 is formed from a polydimethylsiloxane polymeric material, and more preferably is formed exclusively from a polydimethylsiloxane elastomeric material.

In one example, the reservoir 72 is molded as an integral, unitary structure with channels 84a, 84b, conduits 86a, 86b, base 73, and supports 74 as shown in FIG. 3B. One suitable PDMS for such an integrally molded structure is Sylgard® 184, a PDMS elastomer supplied by Dow Corning. Sylgard® 184 is supplied as a two part, unmixed preparation in a ratio of 10:1 base polymer to curing agent by weight. Sylgard® 184 has high transparency and is room temperature and heat curable. The reservoir 72 is structured such that the diffusion path for the photohardening inhibitor to reach the photohardenable material via at least one film 46 is significantly shorter than via any portion of the reservoir 72. As a result, even if reservoir 72 and at least one film 46 have the same photohardening inhibitor permeability, the inhibitor will reach the photohardenable material via the at least one film 46 because it offers the path of least resistance. The reservoir 72 is typically non-rigid. Thus, bonding reservoir 72 to a rigid or semi-rigid transparent substrate 70 creates a photohardening inhibitor delivery device 44 with greater rigidity and stability relative to the reservoir 72 alone.

In certain examples, the at least one photohardening inhibitor-permeable film 46 comprises an elastomeric film that is permeable to the photohardening inhibitor. The elastomeric film is preferably transparent to the solidification energy provided by pattern generator 37. Suitable materials for forming the at least one photohardening inhibitor-permeable film 46 include fluoropolymers and silicone polymers. Suitable fluoropolymers include amorphous fluoroplastic resins, such as DuPont Teflon® AF 2400. Suitable silicone polymers include organo-siloxane polymers. One preferred organo-siloxane polymer is a polydimethylsiloxane ("PDMS"). The at least one photohardening inhibitor-permeable film 46 is bonded to reservoir 72 by surface treating both the at least one film 46 and the reservoir 72 and laminating the at least one film 46 to reservoir 72 using heat and pressure.

In certain examples in which air or oxygen is the photohardening inhibitor, the at least one film 46 comprises a PDMS material and has a permeability ranging from about 360 to about 660 Barrers, preferably from about 380-630 Barrers, and more preferably from about 400 to about 600 Barrers. In other examples in which air or oxygen is the photohardening inhibitor, at least one film 46 comprises a fluoropolymer and has a permeability ranging from about 890 to about 1760 Barrers, preferably from about 940 to about 1680 Barrers, and more preferably from about 990 Barrers to about 1600 Barrers.

The permeability is a measure of mass flux through a film or membrane, normalized for the pressure drop, thickness, and area. Unlike reservoir 72, at least one film 46 has no channels, and its permeability allows the photohardening inhibitor to pass through to the photohardenable material 25. One suitable commercially available material for forming at least one film 46 is Sylgard®184, which may be used in the same ratio of base polymer to curing agent as the reservoir 72.

In certain cases in which at least one film 46 comprises an elastomeric silicone film, the at least one film 46 is hydrophobically modified, such as through surface fluorination, to reduce the tendency of the photohardenable material to adhere to or degrade it. In one implementation of such surface fluorination, hydroxyl groups are introduced onto the elastomeric silicone film outer surface (the surface facing away from continuous chamber 78) by oxygen plasma treatment (such as with a corona pen). A perfluorinated silane dissolved in a perfluorinated solvent is then applied to the outer surface of at least one film 46 to form fluorinated layers. A suitable perfluorinated solvent is perfluorotripropylamine, known as FC-3283 (CAS No. 338-83-0). Suitable perfluorinated silanes include heptadecafluoro-1,1,2,2-tetrahydrodecyl trichlorosilane.

In certain examples, the at least one film 46 has a thickness ranging from about 0.2 to about 2.0 mm, preferably from about 0.15 to about 1.5 mm, and more preferably from about 0.25 to about 1.0 mm. In accordance with such examples, the pressure of the photohardening inhibitor (oxygen in this case) in the continuous chamber is from about 0.1 to about 1.0 psig, preferably from about 0.2 to about 0.8 psig, and more preferably from about 0.3 to about 0.5 psig. When container assembly 28 is open to the atmosphere, the side of at least one film 46 in contact with the photohardenable material will have a gauge pressure equal to the hydrostatic head pressure (density×gravitational constant× height) corresponding to the height of photohardenable material (along the build (z) axis) in the container assembly 28. For a resin with a specific gravity of 1.2, and a liquid level of 4 cm, the pressure on the downstream side of the at least one film 46 would be 0.07 psig. As mentioned previously, the pressure of the photohardening inhibitor in continuous chamber 78 will affect the thickness of the non-solidification zone (the distance from the build plane 32 to at least one film 46 along the build (z) axis).

The flexible nature of an elastomeric film comprising at least one film 46 will cause it to deform when subjected to the upstream photohardening inhibitor pressure. If the elastomeric film is supported only at the edges, then the edges will remain stationary and the greatest deformation will occur in the center. This deformation will distort the planarity of build plane 32, which will in turn cause the three-dimensional object being built to distort. To reduce such distortion and stabilize the elastomeric film, supports 74 are provided as part of reservoir 72 and are bonded to the elastomeric film in the manner described previously for bonding at least one film 46 to reservoir 72. In general, using the same material to form supports 74 and the particular film comprising the at least one film 46 to which they are bonded enhances the ability to bond the supports 74 to the at least one film 46. The supports are preferably sized and arranged to maximize mass transfer of the photohardening inhibitor through the at least one film 46 without allowing the at least one film to distort to an extent that would in turn distort the three-dimensional object to an appreciable extent relative to the object data that defines it. Supports 74 are also sized and arranged to reduce the impact of refractive distortion of light passing through supports 74.

The supports 74 are preferably equidistant from one another over most, substantially all, or all, of the x-y area of the continuous chamber 78. FIG. 4 depicts a top plan view (along the build (z) axis) of the reservoir of FIG. 3B showing an exemplary portion of supports 74. In the depicted example, the supports 74 are each equidistant from all of their closest neighbors. As a result, spaces between the supports 74 defining a plurality of rows along the x-axis and columns along the y-axis are created. One of the rows is called out as $r_1$, and one of the columns is called out as $c_1$ in FIG. 4. In the example, the supports 74 are arranged so as to define a plurality of hexagon patterns (one of which is shown with dashed lines). The continuous chamber 78 has an area defined as the open area between all of the supports 74. In one example, the supports 74 are arranged to define a support density (the percentage of the total x-y area of the chamber 78 occupied by supports) ranging from about one (1) percent to about 50 percent, preferably from about two (2) percent to about 40 percent, and more preferably from about three (3) percent to about seven (7) percent. The percentage of open area in chamber 78 is preferably from about 99 percent to about 50 percent, more preferably from about 98 percent to about 60 percent, and more preferably from about 97 percent to about 93 percent. In certain examples, the supports 74 are cylindrical and have the same diameter, which ranges from about 25 microns to about 250 microns, preferably from about 40 microns to 150 microns, and more preferably from about 50 microns to 100 microns. In the same or other examples, each support 74 is spaced apart from its nearest neighboring supports by a distance of from about 80 microns to about 200 microns, preferably from about 120 microns to about 180 microns, and more preferably from about 140 microns to about 160 microns.

The supports 74 have a build (z) axis height ranging from about 10 microns to about 40 microns, preferably from about 15 microns to about 35 microns, and more preferably from about 20 microns to about 30 microns. In one specific example, the supports 74 are cylindrical with a height of 25 microns, a diameter of 50 microns and have a center-to-center hexagonal spacing of 200 microns, which yields a support density of 5.7 percent and an open area of 94.3 percent.

As mentioned previously, the photohardening inhibitor delivery device 44 is a part of a photohardenable material container assembly. Referring to FIGS. 2A-4, a first exemplary photohardenable material container assembly 28 will now be described. An upper enclosure 42 and lower enclosure 40 define a photohardenable material enclosure and are attached to the photohardening inhibitor delivery device 44 to define a photohardenable material container (i.e., container assembly 28) in which the photohardening inhibitor delivery device 44 acts as a closed bottom of the photohardenable material container. In preferred examples, upper enclosure 42 and lower enclosure 40 are formed from a metal.

Referring to FIGS. 2A and 2B, a lower enclosure 40 includes four vertical sidewalls 61a (not shown), 61b, 62a, and 62b. Sidewalls 61a and 61b are spaced apart along the y axis, and sidewalls 62a and 62b are spaced apart along the x axis. The sidewalls 61a, 61b, 62a, and 62b define a fully enclosed perimeter. Sidewall 62a is connected to base section 60a, and sidewall 62b is connected to base second 60b. Base section 60a includes an outward projection 63a and an inward projection 65a. Similarly, base second 60b includes an outward projection 63b and an inward projection 65b. The outward projections 63a and 63b extend away from their respective sidewalls 62a and 62b and away from central opening 47. The inward projections 65a and 65b project away from their respective sidewalls 62a and 62b in a direction toward central opening 47. Vertical sidewalls 61a (not shown) and 61b have bases with inward projections (projecting away from the corresponding sidewall and toward central opening 47) but do not have outward projections. The outward projections 63a and 63b engage corresponding slots or grooves in a structure attached to housing 22 (FIG. 1) to retain the photohardenable material container assembly 28 to the housing 22.

As shown in FIG. 2B, the inward projections 65a and 65b (along with similar projections (not shown) for sidewalls 61a (not shown) and 61b) define central opening 47. The inward projections 65a, 65b, etc. also define a distal lip 67 that encircles central opening 47. The outer perimeter of the lower surface 71 of rigid or semi-rigid, transparent substrate 70 rests on the distal lip 67, allowing the photohardening inhibitor delivery device 44 to be securely located within the central opening 47 defined by the lower enclosure 40.

Photohardening inhibitor manifolds 68a and 68b are positioned on and attached to inward projections 65a and 65b, respectively. Inlet line 66a is coupled to manifold 68a and outlet line 66b is coupled to manifold 68b. Catheters 80 and 83 (not shown) are connected to manifold 68a to distribute the photohardening inhibitor provided by inlet line 66a to the continuous chamber 78. Catheters 82 and 85 (not shown) are connected to manifold 68b and receive photohardening inhibitor and provide it to the outlet line 66b. Where four catheters are used, the channels 84a and 84b (FIGS. 3A-3C) would be sized to accommodate two catheters each or additional channels would be provided.

Upper enclosure 42 includes vertically upward sidewalls 48a, 48b, 50a, and 50b. Sidewalls 48a and 48b are spaced apart along the x-axis, and sidewalls 50a and 50b are spaced apart along the y-axis. Inward projection 51a (FIG. 2B) is attached to sidewall 48a and inward projection 51b is attached to sidewall 48b. Sidewalls 50a and 50b have similar inward projections. The inward projections 51a and 51b are spaced apart along the x axis but extend toward each other along the x axis, away from their respective sidewalls 50a and 50b and toward central opening 47. Vertically downward side wall 56a is attached to inward projection 51a and is spaced apart from vertically upward sidewall 48a along the x-axis. Inward projection 51a is located between vertically downward sidewall 56a and vertically upward sidewall 48a along the x-axis. Vertically downward side wall 56b is attached to inward projection 51b and is spaced apart from vertically upward side wall 48b along the x-axis. Inward projection 51b is located between vertically downward sidewall 56b and vertically upward sidewall 48b along the x-axis.

Vertically downward side wall 58a is attached to inward projection 59a and is spaced apart from vertically upward sidewall 50a along the y-axis. Inward projection 59a is located between vertically downward side wall 58a and vertically upward side wall 50a along the y-axis. Vertically downward sidewall 58b (not shown) is attached to inward projection 59b (not shown) and is spaced apart from vertically upward sidewall 50b along the y-axis. Inward projection 59b (not shown) is located between vertically upward sidewall 50b (not shown) and vertically downward sidewall 58b (not shown) along the y-axis.

Each inward projection 51a, 51b, 59a, 59b on the upper enclosure has a downward sloping upper surface and a substantially planar lower surface. Thus, inward projection 51a has a downward sloping upper surface 52a and a substantially planar lower surface 53a. Inward projection 51b has a downward sloping upper surface 52b and a substantially planar lower surface 53b. Inward projection 59a has a downwardly sloping upper surface 54a and a substantially planar lower surface (not shown). Inward projection 59b has a downwardly sloping upper surface (not shown) and a substantially planar lower surface (not shown). The inward projections 51a, 51b, 59a, and 59b and their corresponding downwardly sloping upper surfaces 52a, 52b, 54a, and 54b provide a means for funneling photohardenable material received by the container assembly 28 into the open area defined by central opening 47. The downwardly sloping upper surfaces 52a, 52b, 54a, 54b (not shown), and vertically downward sidewalls 56a, 56b, 58a, 58b of upper enclosure 42 cooperate with the vertically upward side walls 61a (not shown), 61b (not shown), 62a, and 62b and the inward base projections 60a, 60b (and two others, not shown) of lower enclosure 40 to define an enclosure for housing the photohardening inhibitor manifolds 68a and 68b.

In certain examples involving PDMS films, at least one film 46 may tend to fog up if the moisture content of the photohardening inhibitor is high enough. In one example involving an oxygen, photohardening inhibitor, the oxygen supply is filtered to remove moisture before entering the continuous chamber 78.

In other examples involving PDMS films, the at least one film 46 may tend to become hazy when using certain photoinitiators. In certain cases, at least one film 46 may become hazy during photohardening when constructed of PDMS and when the photohardenable material includes acyl phosphine oxide initiators such as Irgacure 819 (bis acyl phosphine oxide (BAPO)), and Darocur® TPO (mono acyl phosphine oxide (MAPO)). In such cases, it has been found beneficial to place a fluoropolymer film on top of the PDMS film so that the at least one film 46 comprises two film layers to reduce or eliminate the hazing. Preferred fluoropolymer films include amorphous fluoropolymer films. A commercial example of a suitable film is AF-2400 (discussed above). The fluoropolymer film is preferably not stretched, and in certain examples is also preferably not fixedly attached to the PDMS film such by using an adhesive. In one example, the edge of the fluoropolymer film is sandwiched between the upper surface of at least one film 46 and the bottom surface of the upper enclosure vertically downward sidewalls 56a, 58a, 56b, and 58b (not shown), however, the central part of the fluoropolymer film is not bonded or secured to the PDMS film.

A method of using the photohardenable material container assembly 28 will now be described. In accordance with the method, photohardenable material container assembly 28 is provided and is attached to housing 22 as shown in FIG. 1. The photohardening inhibitor delivery device 44 defines the bottom of the container assembly 28. A volume of photohardenable material 25 is added to the container assembly 28. The photohardenable material 25 contacts the at least one film 46, thereby defining a film/material interface. A photohardening inhibitor is supplied through continuous chamber 78 (FIG. 3A) and to the at least one film 46 such that the inhibitor permeates the at least one film 46. A previously formed object surface 27 (FIG. 1) is immersed into the volume of photohardenable material 25 such that the previously formed object surface 27 is spaced apart from the at least one film 46 (not visible in FIG. 1). As shown in FIG. 1, previously formed object surface 27 is spaced a layer thickness away from the build plane 32 which is spaced apart from the at least one film 46 along the build (z) axis. Pattern generator 37 supplies solidification energy corresponding to a cross-section of the three-dimensional object through the at least one film 46 to form a currently exposed object surface (not shown) that is spaced apart from the at least one film 46, wherein during the step of supplying solidification energy, the photohardening inhibitor prevents the photohardenable material 25 from solidifying within a zone of non-solidification 41 that includes the film/material interface. As a result, the photohardenable material 25 does not adhere to the at least one film 46 and does not need to be separated from it. The process is repeated until the object is complete.

Figure 5A:
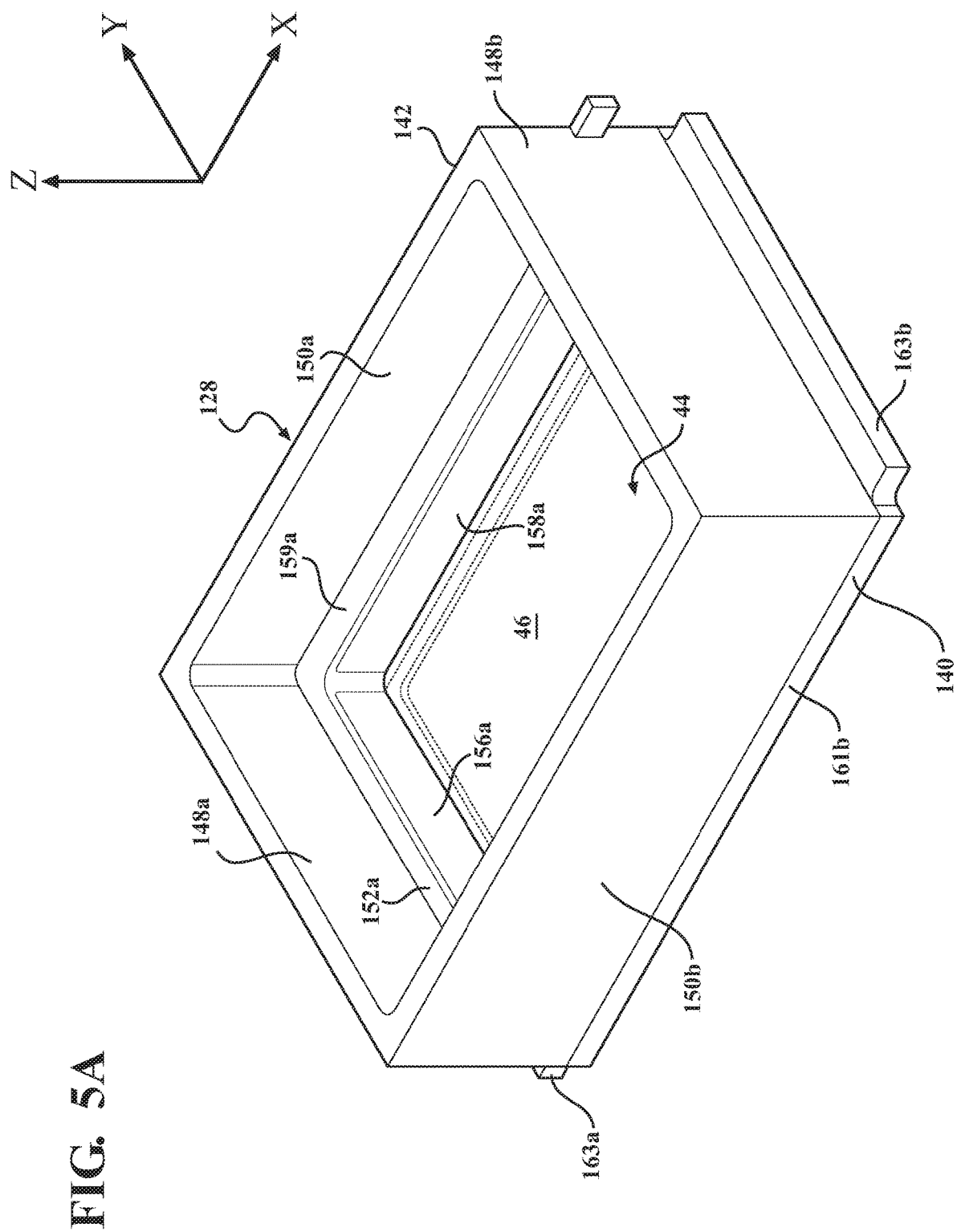
FIG. 5A is a perspective view of a second exemplary photohardenable material container assembly comprising a photohardening inhibitor delivery device that includes a stabilized photohardening inhibitor permeable film and a photohardening inhibitor reservoir.
Figure 5B:
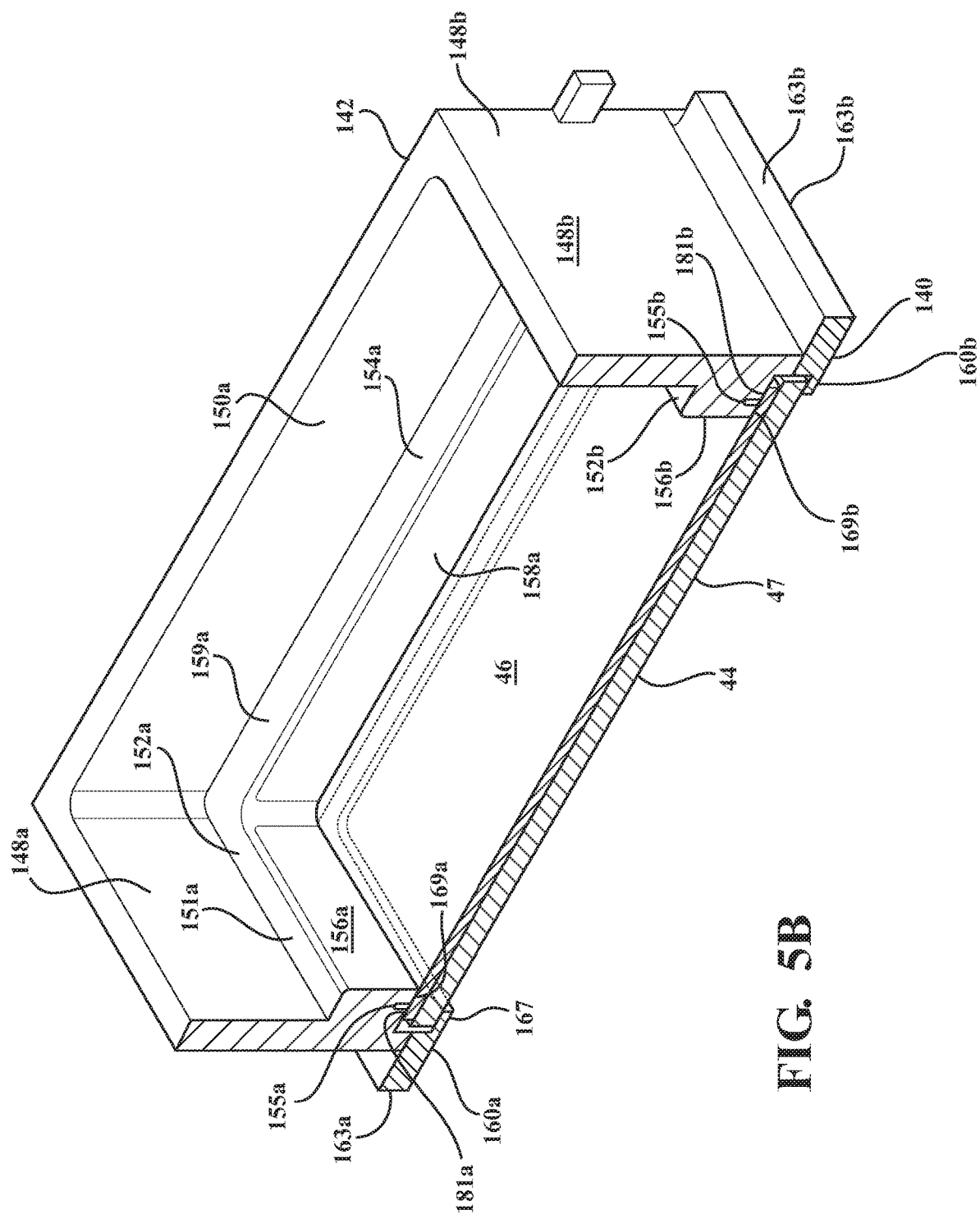
FIG. 5B is a cut-away view of the photohardenable material container assembly of FIG. 5A viewed along the y-axis.
Figure 5C:
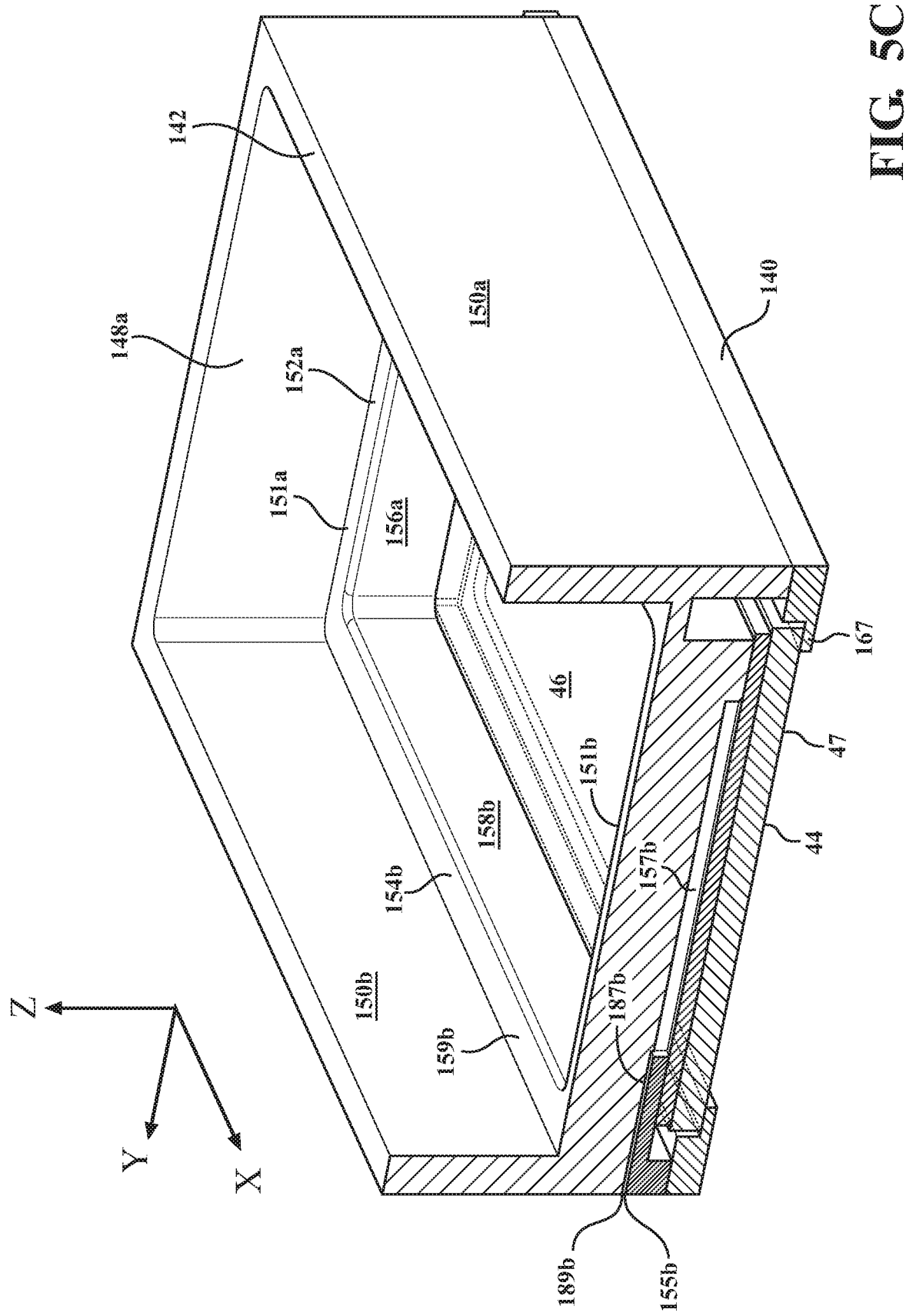
FIG. 5C is a cut-away view of the photohardening material container assembly of FIG. 5B taken through gallery 155*b* and viewed along the x-axis.

Referring to FIGS. 5A-5C, a second exemplary photohardenable material container assembly 128 will now be described. Parts that are analogous to the components of first exemplary photohardenable material container assembly 28 will be identified with the same reference numeral plus 100. An upper enclosure 142 and lower enclosure 140 define a photohardenable material enclosure and are attached to the photohardening inhibitor delivery device 44 to define a photohardenable material container (i.e., container assembly 128) in which the photohardening inhibitor delivery device 44 acts as a closed bottom of the photohardenable material container 128. In preferred examples, upper enclosure 142 and lower enclosure 140 are formed from a metal.

Referring to FIGS. 5A and 5B, lower enclosure 140 includes base section 160a, 160b, 161a (not shown) and 161b. Base sections 160a, 160b, 161a and 161b define a central opening 47. The base sections 160a, 160b, 161a and 161b each define an inwardly projecting lip 167 that encircles opening 47. The inwardly projecting lip 167 allows the photohardening inhibitor delivery device 44 to be securely located within the central opening 47 defined by the lower enclosure 140.

Base section 160a includes an outward projection 163a, and base section 160b includes an outward projection 163b. The outward projections 163a and 163b engage corresponding slots or grooves in a structure attached to housing 22 (FIG. 1) to retain the photohardenable material container assembly 128 to the housing 22.

Upper enclosure 142 includes vertically upward sidewalls 148a, 148b, 150a, and 150b. Sidewalls 148a and 148b are spaced apart along the x-axis, and sidewalls 150a and 150b are spaced apart along the y-axis. Inward projection 151a (FIG. 5B) is attached to sidewall 148a and inward projection 151b is attached to sidewall 148b. Sidewalls 150a and 150b have similar inward projections. The inward projections 151a and 151b are spaced apart along the x axis but extend toward each other along the x axis, away from their respective sidewalls 150a and 150b and toward central opening 147. Vertically downward side wall 156a is part of inward projection 151a. Vertically downward side wall 156b is part of inward projection 151b. Vertically downward side wall 158a is part of inward projection 159a. Vertically downward sidewall 158b (not shown) is part of inward projection 159b (not shown).

Each inward projection 151a, 151b, 159a, 159b on the upper enclosure has a substantially planar, upward-facing (along the z-axis) surface. Thus, inward projection 151a has a substantially planar upward facing surface 152a. Inward projection 151b has a substantially planar upward facing surface 152b. Inward projection 159a has a substantially planar upward facing surface 154a. Inward projection 159b has a substantially planar upward facing surface 154b (not shown).

Unlike photohardening material container assembly 28 of FIGS. 2A-2C, assembly 128 of FIGS. 5A-5C uses galleries instead of manifolds to supply photohardening inhibitor to continuous chamber 78. Gallery 155a comprises a chamber drilled into inward projection 151a. The gallery 155a is a chamber bounded on three sides by the inward projection 151a and on the bottom by at least one film 46 of the photohardening inhibitor delivery device 44. The portion of the at least one film 46 that defines the bottom of gallery 155a preferably has a plurality of openings created in it so that the inhibitor can flow from the gallery 155a to the channel 84a (FIGS. 3B-3C) or vice-versa. Gallery 155a is defined by two downward facing surfaces 169a and 181a which tightly seal the at least one film 46 to prevent inhibitor leakage out of the gallery 155a. Gallery 155b is similarly defined by two downward facing surfaces 169b and 181b that tightly seal at least one film 46 to prevent inhibitor leakage out of gallery 155b. The portion of at least one film 46 that defines the bottom of gallery 155b preferably has a plurality of openings in it to allow the inhibitor to flow into channel 84b or vice-versa. The photohardening inhibitor may enter one of the two galleries 155a and 155b and exit the other of the two galleries 155a and 155b.

A side view of gallery 155b is provided in FIG. 5C. When it acts as a photohardening inhibitor supply gallery, gallery 155b includes an inlet 189b formed in inward projection 151b of sidewall 148b of upper enclosure 142. Gallery 155b also includes an inlet channel 187b that feeds film sealing channel 157b. The film sealing channel 157b is where the inhibitor flows down through openings in the at least one film 46 and into channel 84b. Similarly, where it acts as a photohardening inhibitor return gallery, gallery 155a includes an outlet 189a and an outlet channel 187a (not shown) which allows excess inhibitor to exit the photohardening inhibitor delivery device 44. The inlet 189b and outlet 189a are not shown in FIG. 5A. As with photohardenable material container assembly 28, in certain cases in which an elastomeric PDMS film is used as the at least one film 46, it becomes hazy. In such cases, it is preferably to place a fluoropolymer film over at least one film 46 such that the edges of the fluoropolymer film are sandwiched between the at least one film 46 and the downward extending vertical walls 156a, 158a, 156b, and 158b of the lower enclosure 140.

A method of using the photohardenable material container assembly 128 will now be described. In accordance with the method, photohardenable material container assembly 128 is provided and is attached to housing 22 as shown in FIG. 1. The photohardening inhibitor delivery device 44 defines the bottom of the container assembly 128. A volume of photohardenable material 25 is added to the container assembly 128. The photohardenable material 25 contacts the at least one film 46, thereby defining a film/material interface. A photohardening inhibitor is supplied via gallery inlet 189b, gallery 155b, through continuous chamber 78 (FIG. 3A) and into the at least one film 46 such that the inhibitor permeates the at least one film 46. Excess inhibitor exits through gallery 155a and outlet 189a. A previously formed object surface 27 (FIG. 1) is immersed into the volume of photohardenable material 25 such that the previously formed object surface 27 is spaced apart from the at least one film 46 (not visible in FIG. 1). As shown in FIG. 1, previously formed object surface 27 is spaced a layer thickness away from the build plane 32 which is spaced apart from the at least one film 46 by the build axis (z) height of the zone of non-solidification 41 along the build (z) axis. Pattern generator 37 supplies solidification energy corresponding to a cross-section of the three-dimensional object through the at least one film 46 to form a currently exposed object surface (not shown) that is spaced apart from the at least one film 46, wherein during the step of supplying solidification energy, the photohardening inhibitor prevents the photohardenable material 25 from solidifying within a zone of non-solidification 41 that includes the film/material interface. As a result, the photohardenable material 25 does not adhere to the at least one film 46 and does not need to be separated from it. The process is repeated until the object is complete.

In certain preferred examples, while the pattern generator 37 is supplying solidification energy to the photohardenable material 25, the build platform 26 continues to move upward and away from the photohardenable material container assembly 28 along the build (z) axis. The creation of a zone of non-solidification 41 enables the movement of build platform 26 as solidification is occurring because separation of solid photohardenable material from the at least one film 46 is not required.

In other preferred examples, discontinuous movement of the build platform 26 is used. In certain implementations, the build platform 26 remains stationary when the pattern generator 37 supplies solidification energy into the photohardenable material. After a given layer is solidified, the build platform 26 moves upward (along the build (z) axis) by an amount greater than the solidified layer thickness Δz and then moves downward (along the build (z) axis) until the exposed (downward-facing) object surface 27 is spaced apart from the zone of non-solidification 41 by the layer thickness Δz. This up and down movement is particularly useful in those examples in which a loose film (such as a fluoropolymer film sitting on flexible film) is used as the at least one film 46. As mentioned previously, fluoropolymer films are particularly useful as loose films sitting on a at least one film 46 comprising PDMS to combat the formation of haze that occurs with PDMS films and certain photoinitiators, such as acylphosphine oxides. The loose film is sandwiched between the upper enclosure 42, 142 and the flexible film at its edges but is not fixedly attached to the upper enclosure 42, 142 or the flexible film. As a result, the loose film can stretch in the middle, whereas the flexible film is adhered to supports 74. As a result, when the build platform 26 moves up along the build (z) axis (away from the at least one film 46), the interior region of the loose film may deform upward along the build (z) axis. The up and down movement resets the loose film to a substantially flat configuration. Maintaining the loose film in a flat configuration minimizes inaccuracies in the resulting three-dimensional object. In certain examples involving flat surfaces over two inches by two inches, the technique is especially preferred. In some implementations, the speed of build platform movement up and down ranges from about 15 to about 120 microns per second, preferably from about 20 to about 110 microns per second, and more preferably from about 25 to about 100 microns per second. In the same or other examples, the build platform 26 is moved upward by an amount ranging from about 300 microns to about 2 mm, preferably from about 250 microns to 1.5 mm, and more preferably from about 250 microns to about 1 mm before moving down to a distance one layer thickness from the non-solidification zone 41.

During the step of supplying solidification energy through the at least one film 46, the solidification energy travels through the rigid or semi-rigid transparent substrate 70, through the base 73 of photohardening inhibitor reservoir 72, into continuous chamber 78, and through the at least one film 46. Because the supports 74 are transparent, they allow the image to pass through them without appreciable distortion on the image or impact on the resulting three-dimensional object. However, some distortion may occur in the portions of the image passing through the supports 74 relative to portions passing through the open area of continuous chamber 78 because the index of refraction of the support 74 material differs from the index of refraction of the oxygen in the continuous chamber 78. In preferred examples, the number of supports 74, their distribution, and their individual sizes are selected to minimize image distortion while at the same time providing enough support to maintain at least one film 46 in a substantially planar configuration. In particular, the diameter and build (z) axis height of the supports 74 are preferably minimized to reduce the amount of image distortion. The diameter impacts the amount of light that travels through and is refracted by each support, while each support height determines the optical path length and the extent to which any particular ray of light is diffracted.

The pressure of the photohardening inhibitor in continuous chamber 78 is preferably set at a value that ensures that the zone of non-solidification 41 between build plane 32 and at least one film 46 is maintained. If the build platform 26 moves continuously upward along the build (z) axis, the speed is preferably set or controlled to ensure that there is no delamination along the build (z) axis. If the build platform 26 moves too quickly, solidification of a current section may occur too late relative to a previous section, causing delamination. If the pressure of the photohardening inhibitor in continuous chamber 78 is set to too low, the build plane 32 will coincide with the at least one film 46 causing the photohardenable material to solidify in contact with the at least one film 46, requiring separation of the solidified material from the at least one film 46.

A method of determining the structural integrity of photohardening inhibitor delivery device 44 will now be described. The method is particularly suited for determining if any of the supports 74 have collapsed and/or if there are areas within continuous chamber 78 which are otherwise obstructed. Such obstructions may impair the ability to form a consistent zone of non-solidification. In accordance with the method, the photohardening inhibitor reservoir 72 and inlet line 66a are pressurized to a first pressure $P_{i1}$ with a gas (which may comprise the photohardening inhibitor), and the photohardening inhibitor outline line 66b is blocked in. Photohardenable material 26 is preferably not provided in the container 28 during the method. The outlet line 66b is then placed in fluid communication with an inhibitor destination (e.g., atmosphere or a pressure-regulated container), the inhibitor destination being held at a second pressure $P_{o2}$ less than the first pressure. A pressure $P_{i2}$ is measured on an upstream side of the photohardening inhibitor after placing the downstream side of the photohardening inhibitor reservoir in fluid communication with the inhibitor destination; and the photohardenable material container is replaced with another photohardenable material container if the measured pressure drop $P_{i2}-P_{o2}$ is more than a selected percentage of the maximum available pressure drop $\Delta P_{max}$, which is the difference between the initial inlet pressure $P_{1i}$ and the outlet pressure $P_{o2}$ after the outlet is placed in fluid communication with an inhibitor destination having a pressure of $P_{o2}$.

Referring to FIG. 2B, in accordance with an exemplary method of determining the structural integrity of photohardening inhibitor delivery device 44, a source of gaseous polymerization inhibitor is fed to inhibitor inlet line 66a while blocking in inhibitor outlet line 66b. A pressure $P_{i1}$ upstream of the continuous chamber 78 is measured, such as by placing a pressure gauge on the inlet line 66a. Because the outlet line is blocked in, the initial outlet pressure $P_{o1}$ is the same as the initial inlet pressure $P_{i1}$. Once the desired initial pressure $P_{i1}$ is achieved, the pressure of the inhibitor source is allowed to float and is not controlled to a particular value. The outlet line 66b is then unblocked and held at a constant pressure $P_{o2}$ lower than the initial desired pressure. In one example, the outlet line 66b is vented to atmosphere, in which case $P_{o2}$ is 0 psig, which is 14.7 psia at sea level). The maximum available pressure drop $\Delta P_{max}$ across the device 44 is $P_{i1}-P_{o2}$. In the event there are no damaged supports or other blockages in continuous chamber 78, the inlet line 66a pressure would be expected to drop to the outlet pressure or one that is somewhat above it in which case the actual pressure drop $\Delta P_{act}=P_{i2}-P_{o2}$ would be zero or a relatively small percentage of the maximum available pressure drop $\Delta P_{max}$. In the event of a blockage, the inlet line 66a pressure $P_{i2}$ drops to a pressure that is lower than the initial pressure $P_{i1}$ but higher than the outlet pressure $P_{o2}$, indicating that there is a significant pressure drop across the continuous chamber 78 (the rate of inhibitor transfer through the at least one film 46 is typically so slow that it has no appreciable effect on the inlet pressure when using this method) due to whatever obstruction or blockage is present. In that case, the actual pressure drop $\Delta P_{act}$ is a relatively higher percentage of the maximum pressure drop $\Delta P_{max}$. In preferred examples the actual pressure drop $\Delta P_{act}$ upon opening the outlet line 66b is no more than 60 percent, preferably no more than 50 percent, and still more preferably, no more than 40 percent of the maximum pressure drop $\Delta P_{max}$.

For example, if the outlet line 66b is blocked in, and the gaseous polymerization inhibitor is fed to the polymerization inhibitor delivery device 44 via the inlet line 66a until an inlet pressure of 1 psig (14.7 psia) is reached, the inlet line 66a pressure $P_{i1}$ will be 1 psig, which is 15.7 psia at sea level. If the outlet line 66b is opened and vented to atmosphere, the outlet line pressure $P_{o2}$ will be 0 psig, which is 14.7 psia (at sea level). If upon opening the outlet line 66b the inlet line 66a pressure is 0.6 psig (15.3 psia), the actual pressure drop $\Delta P_{act}$ will be 0.6 psi, which is 60 percent of the maximum pressure drop $\Delta P_{max}$ (1 psi). In one exemplary implementation, an initial inlet line 66a pressure of 1 psig is used, and the outlet line 66b is vented to atmosphere upon opening. In this case, the preferred inlet line 66a pressure upon opening outlet line 66b is no more than 0.6 psig, with pressures of no more than 0.5 psig and no more than 0.4 psig being preferred and more preferred, respectively. Because the outlet line 66b is vented to atmosphere, $P_{o2}$ is 0 psig. Thus, the pressure drop has the same numerical value as the inlet gauge pressure.

Moreover, when the at least one film 46 comprises a fluoropolymer film such as FEP on a PDMS film (with the fluoropolymer film being sandwiched at between the PDMS film and the edges 56a, 56b, 58a, and 58b of the container 28), as the build axis height of the dead zone 71 drops, eventually the vacuum forces generated by moving the build platform 26 away from the non-solidification zone 71 will separate the fluoropolymer film from the PDMS film. Thus, in preferred examples, container 28 is replaced unless the actual pressure drop $\Delta P_{act}$ is no more than 60 percent, preferably no more than 50 percent, and still more preferably no more than 50 percent of the maximum pressure drop $\Delta P_{max}$. In certain examples, the foregoing method is done to determine whether a particular container 28 will be provided to customers with an apparatus for making a three-dimensional object 20.

As an alternative to directly feeding oxygen gas to the flexible film, an oxygen saturated carrier liquid may also be used. The liquid acts as a carrier for the photoinhibitor (e.g., oxygen), and within continuous chamber 78, the photoinhibitor diffuses from the carrier liquid, across at least one film 46 and into the photohardenable material 25.

Suitable carrier liquids include fluorinated oil, such as perfluorocarbons, and perfluoropolyethers. Exemplary perfluorocarbon carrier liquids include perfluorohexane and perfluorodecalin. Perfluorohexane has an oxygen solubility (at 25° C.) of 69 mL oxygen per 100 mL perfluorohexane. Perfluorodecalin has an oxygen solubility (at 25° C.) of 49 mL oxygen per 100 mL perfluorodecalin.

Exemplary perfluoropolyethers include Galden-HT55, a pefluoropolyether heat transfer fluid supplied by Solvay SA of Belgium. Galden-HT55 has an air solubility (at 25° C.) of 26 mL air per 100 mL fluid). The carrier liquid may be introduced at a temperature lower than that of at least one film 46, which will tend to increase the non-solidification zone 41 height along the build (z) axis. It will also keep the reservoir 72 continuous chamber 78 cleaner and clearer. In certain implementations, the liquid could be selected so that when saturated with oxygen, its refractive index is close to that of the reservoir 72 material (e.g., an index of about 1.4 in the case of PDMS) to reduce any image distortion produced by the refraction of the pattern generator 37 light by supports 74.

Figure 6:
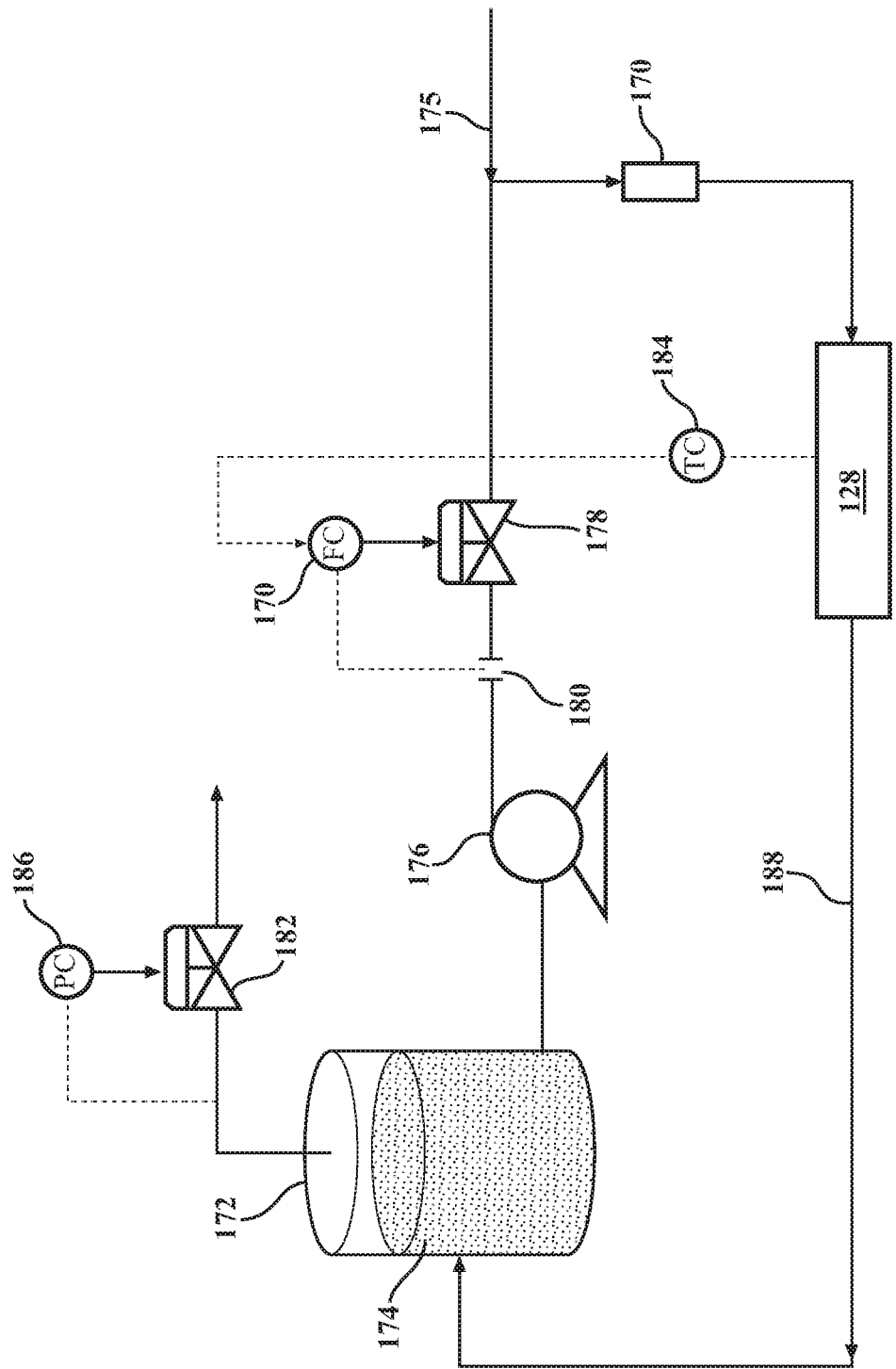
FIG. 6 is a system diagram of a system for delivering an oxygen saturated fluid to a photohardenable material container.

A system for delivering a photoinhibitor saturated fluid to a photohardenable material container assembly 128 (or 28) is depicted in FIG. 6. Reservoir 172 holds a volume of carrier liquid 174. In some examples, reservoir 172 may be open to the atmosphere. In the example of FIG. 6, the reservoir 172 is pressure controlled using pressure controller 186 which manipulates pressure control valve 182 to adjust the amount of gas vented from reservoir 172 and hold the pressure of reservoir 172 at a desired value. Pump 176 pumps carrier liquid 174 through flow control valve 178, after which photoinhibitor stream 175 is injected into the carrier liquid (e.g. using an oxygen bubbler). The inhibitor/carrier liquid stream then passes through a bubble trap 170 to remove bubbles before entering the photohardening inhibitor delivery device 44 (not visible in FIG. 6) within photohardenable material container assembly 128 (or 28). Exemplary bubble traps include the Cole-Parmer Inline Bubble trap made of PTFE and PEEK.

The carrier liquid/inhibitor will pass through gallery 155b and into continuous chamber 78, from which the inhibitor will diffuse out of the carrier liquid, across the at least one film 46, and into the photohardenable material 25. The remaining carrier liquid will exit at gallery 155a. If photohardenable material container assembly 28 is used, the carrier liquid will enter and exit via the manifolds 68a and 68b. Contaminants within the photohardenable material 25 may diffuse from the volume of photohardenable material proximate at least one film 46 and into the carrier liquid 174 to exit photohardenable material container assembly 128 at exit stream 188. Such contaminants may include those that cause at least one film 46 to develop a haze.

In one example, the flow rate of the carrier liquid 172 may be used to control the temperature of the side of the at least one film 46 facing into continuous chamber 78. In addition to or instead of using the carrier liquid flow rate to control the temperature of the at least one film 46, a cooling element may be provided to cool the carrier liquid stream. The cooling element is preferably located upstream of the bubble trap 170, such as proximate the inlet of bubble trap 170 or at reservoir 172. Cooling the carrier liquid can reduce the oxygen solubility and cause bubble formation. Thus, it is preferable to introduce the cooling prior to the bubble trap 170. A thermocouple may be attached to the at least one film 46 to provide a temperature reading to temperature controller 84. Alternatively, the thermocouple may be placed in the photohardenable material proximate the at least one film 46. The temperature of the at least one film 46 may provide an indirect indication of the temperature of the photohardenable material 25, and by controlling the temperature, the build (z) axis height of the non-solidification zone 41 can be controlled. In one exemplary control scheme, temperature controller 184 is cascaded to a flow controller 170 which controls the flow rate measured by flow meter 180 by manipulating control valve 178. In another example, the temperature controller 184 may directly manipulate control valve 178 without being cascaded to an intervening controller. In either case, the flow rate of carrier liquid 174 is manipulated to control the temperature of the at least one film 46 and the photohardenable material 25 proximate the at least one film 46.

Figure 7:
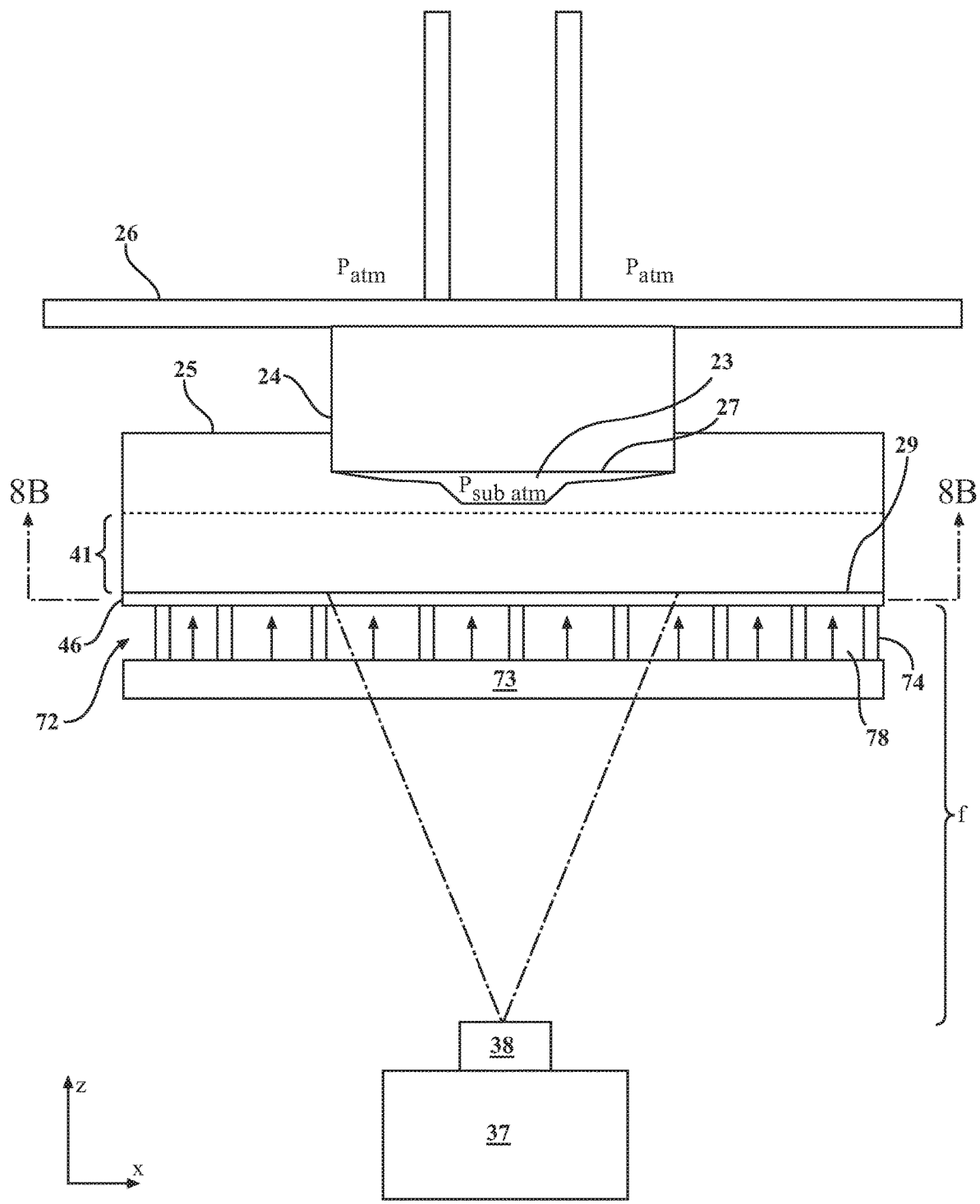
FIG. 7 is a schematic view of an apparatus for making a three-dimensional object from a solidifiable material illustrating the zone of non-solidification and the development of vacuum forces that resist movement of the build platform away from the zone of non-solidification.

Referring to FIG. 7, it has been found that in certain cases, as a partially-completed object 24 is pulled away from the photohardening inhibitor delivery device 44 and the non-solidification zone 41, vacuum forces (forces attributable to a sub-atmospheric pressure) are generated which resist the movement of build platform 26 away from non-solidification zone 41 and from photohardening inhibitor delivery device 44 (a portion of which is shown in FIG. 7) along the build (z) axis. Thus, FIGS. 7-10 describe apparatuses and methods used to address such vacuum forces. In FIG. 7, the sidewalls 48a, 48b, 50a, and 50b of enclosure 42 are not shown. Nor are the downwardly sloping upper surfaces 52a, 52b, 54a, and 52b or vertically downward side walls 56a, 56b, 58a, and 58b.

In FIGS. 7-10, like numerals from FIGS. 1-6 have the same meanings unless otherwise indicated. As illustrated in FIG. 7, as the build platform 26 is moved away (upward) from the photohardening inhibitor delivery device 44 and the non-solidification zone 41 along the build (z) axis, a depletion zone 23 is created in which photohardenable material 25 is not present because it has been solidified and has become part of object 24. Eventually, fresh unsolidified photohardenable material 25 flows into the depletion zone 23. However, initially, some amount of depletion occurs, especially when the photohardenable material 25 is more viscous. The depletion of photohardenable material creates a subatmospheric pressure $P_{sub\ atm}$ in depletion zone 23. During this period, the build platform 26 continues to be subject to atmospheric pressure (the partially-completed object 24 also exerts a downward force and pressure on the build platform 26). Thus, there is a net pressure difference $P_{atm}-P_{sub\ atm}$ exerted on the build platform 26 which resists the platform's movement along the build (z) axis in a direction way from photohardening inhibitor delivery device 44 and non-solidification zone 41. If the build platform 26 is pulled away too quickly along the build (z) axis, it may cause damage to three-dimensional object 24. Moreover, it may cause damage to the at least one film 46 or cause it to separate from or damage supports 74. Accordingly, in certain exemplary embodiments, an apparatus for making a three-dimensional object is provided in which components of the apparatus are designed to tolerate such vacuum forces. In the same or other examples, the method of making the three-dimensional object is modified to reduce the impact of such vacuum forces on components of the apparatus.

As mentioned previously, photohardening inhibitor delivery device 44 includes a continuous chamber 78 within which supports 74 are disposed. The supports have heights along the build (z) axis and cross-sectional areas in the x-y plane. The supports 74 are bonded to at least one film 46, which preferably includes a flexible film and a protective film on top of the flexible film. Preferred flexible films include PDMS films. Preferred protective films include fluoropolymer films. In the same or other examples, the relative dimensions of the photohardening inhibitor delivery device supports 74 and the projected pixels sizes from pattern generator 37 are selected to reduce the impact of supports 74 on the quality of three-dimensional object 24.

When the build platform 26 is moved upward, vacuum forces generated in depletion zone 23 may have the propensity to damage the at least one film 46 and/or supports 74. In certain examples, the support geometry is selected to resist such damage. Referring to FIG. 7, in certain examples a ratio of the height h (along the z-axis) and the cross-sectional area A (in the x-y plane) of the supports 74 is no more than $0.2\mu^{-1}$, preferably no more than $0.15\mu^{-1}$, and still more preferably no more than $0.1\mu^{-1}$. In the same or other examples, the ratio of the support heights to their cross-sectional areas is at least about $0.0005\mu^{-1}$, preferably at least about $0.0008\mu^{-1}$, and more preferably, at least about $0.001\mu^{-1}$.

In the same or other examples, the (dimensionless) ratio of the support heights h to the support diameters D is no more than five (5), preferably no more than three (3), more preferably no more than two (2) and still more preferably no more than one. It is believed that maintaining a ratio of support height to cross-sectional area and/or a ratio of support height to diameter below a desired threshold provides more structural integrity to the supports 74 and better ensures that they endure the forces they experience when the build platform 26 is elevated against a resistive force caused by a vacuum (sub-atmospheric pressure $P_{sub\ atm}$) in the depletion zone 23. The number of supports is selected to prevent significant deformation of the at least one film 46. In certain examples, the continuous chamber has a percent open area (i.e., 100 times the ratio of the area not occupied by supports to the total area of the continuous chamber 78) from about 99 percent to about 50 percent, preferably from about 98 percent to about 60 percent, and more preferably from about 97 percent to about 93 percent of the continuous chamber 78 area. The support density is the percentage of the continuous chamber 78 area occupied by supports, wherein the sum of the support density and the percentage open area is 100. Thus, the support density is from about one (1) to about 50 percent, preferably from about two (2) to about 40 percent, and more preferably from about three to about seven percent of the continuous chamber 78 area.

In certain preferred embodiments, pattern generator 37 is a digital light projector (DLP) with a DMD mirror array. Each mirror in the DMD mirror array corresponds to one pixel of projected solidification energy on the energy-incident photohardenable material surface 29 that is defined by the interface between the photohardenable material 25 and the at least one film 46. In FIG. 8B, the all of the DMD mirrors area activated. Thus, the maximum number of projected pixels 206 appears on the energy-incident surface 29 of photohardenable material 25. The actual number of pixels 206 is not shown. The number of pixels is for illustrative purposes only, and their sizes are greatly exaggerated. As FIG. 8B indicates, the build area defined by L2 and W2 is less than the area 204 in the x-y plane defined by the volume of photohardenable material 25.

One problem that may arise when using photohardening inhibitor delivery device 44 is that the supports 74 may impact the quality of the image delivered to photohardenable material 25. Even if they are transparent, the supports 74 will have a different index of refraction than the inhibitor-rich continuous chamber 78, which can cause image distortion. If the support cross-sectional area (x-y plane) is too large, an imprint of the supports may show up in the resulting three-dimensional object 24. However, if the support cross-sectional area is too small, the supports 74 will have trouble resisting the force of the build platform 26 required to overcome the sub-atmospheric pressure in depletion zone 23. In general, as the cross-sectional area (x-y plane) of the object 24 increases, the support 74 cross-sectional area required to tolerate the build platform 26 forces increases.

In preferred examples, the support 74 cross-sectional areas do not exceed the projected pixel 206 areas on the solidification energy incident surface 29 of the photohardenable material 25 in the x-y plane. In FIG. 8B the support cross-sectional area 208 is shown superimposed with the pixel 206 cross-sectional areas. As shown more clearly in FIG. 8D, the DMD mirrors 201 are square. The projected pixels 206 are also generally square. However, some deviations from a perfect square shape may occur, and some overlap between projected pixels may occur. The centers of the mirrors in FIG. 8D are represented with a lower case letter c, and the centers of the projected pixels 206 are represented with an upper case C. The center-to-center linear spacing of the DMD mirror sides is known as the mirror pitch and is represented as a lower case letter p in FIG. 8C. The idealized (perfect square) center to center spacing of the projected pixels 206 is known as the pixel pitch and are represented as an upper case P in FIG. 8E. As FIG. 8C indicates, the mirror pitch p also equals the distance from the mid-points between adjacent mirrors (shown as dashed lines). As FIG. 8D indicates, the pixel pitch P also equals the distance between the mid-points between adjacent mirrors (shown as dashed lines).

The numbers of supports 74 and pixels 206 are for illustrative purposes only and do not represent exemplary or preferred numbers of pixels 206 or supports 74. The individual support 74 cross-sectional areas are preferably no more than 90 percent, more preferably no more than 80 percent, and still more preferably, no more than 60 percent of the individual projected pixel 206 areas. In certain preferred examples, the pixel shapes are substantially square, and the support 74 diameters are less than the pixel pitch (defined below), preferably no more than 90 percent, more preferably no more than 80 percent, and still more preferably no more than 60 percent of the pixel pitch.

When the maximum number of pixels is activated, an array of pixels 206 is projected onto photohardenable material solidification energy incident surface 29 which has an array length L2 and an array width W2. The area occupied by the maximum number of projected pixels is the "build area" (L2×W2) and represents the maximum cross-sectional area of a three-dimensional object which may be built. It should be noted that while solidification does not occur at energy-incident surface 29, but occurs outside of and adjacent to non-solidification zone 41, the change in pixel size between the energy-incident surface 29 and the boundary of non-solidification zone 41 is insignificant because of the small depth of the non-solidification zone 41, despite the exaggerated appearance of FIG. 7.

The projected pixel size depends, in part, on the placement of the DLP (pattern generator 37) relative to the solidification energy incident surface 29 of photohardenable material 25. In preferred examples, the DLP 37 is spaced apart from the exposed photohardenable material energy incident surface 29 by a distance along the build (z) axis that provides a focused image on the energy-incident surface 29. In preferred examples, the distance is substantially the same, or preferably the same, as the focal distance f of the optics 38 comprising the DLP 37. The "focal length" is the distance at which a lens focuses a point at an infinite distance from the lens.

Figure 8A:
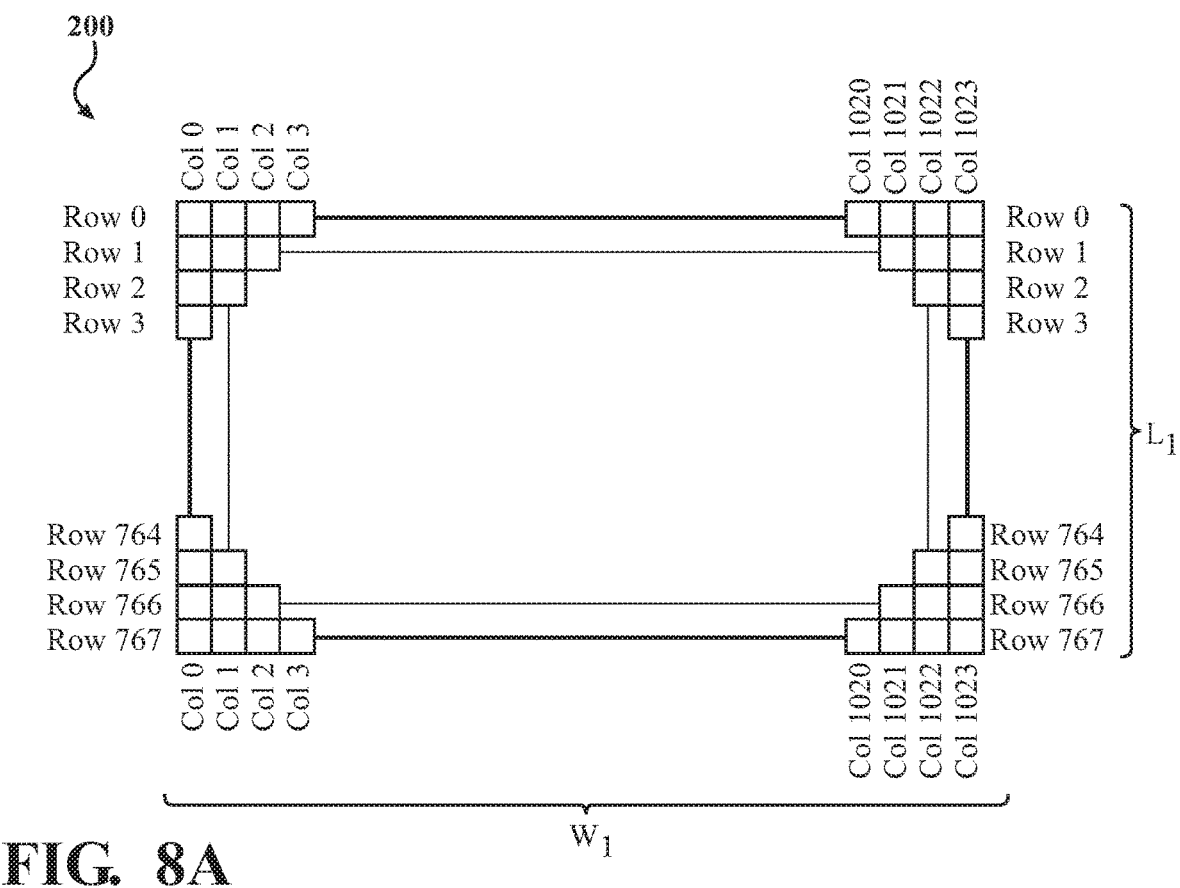
FIG. 8A is a schematic view identifying select mirrors in a digital micromirror device (DMD) used in the solidification energy source of FIG. 7.
Figure 8B:
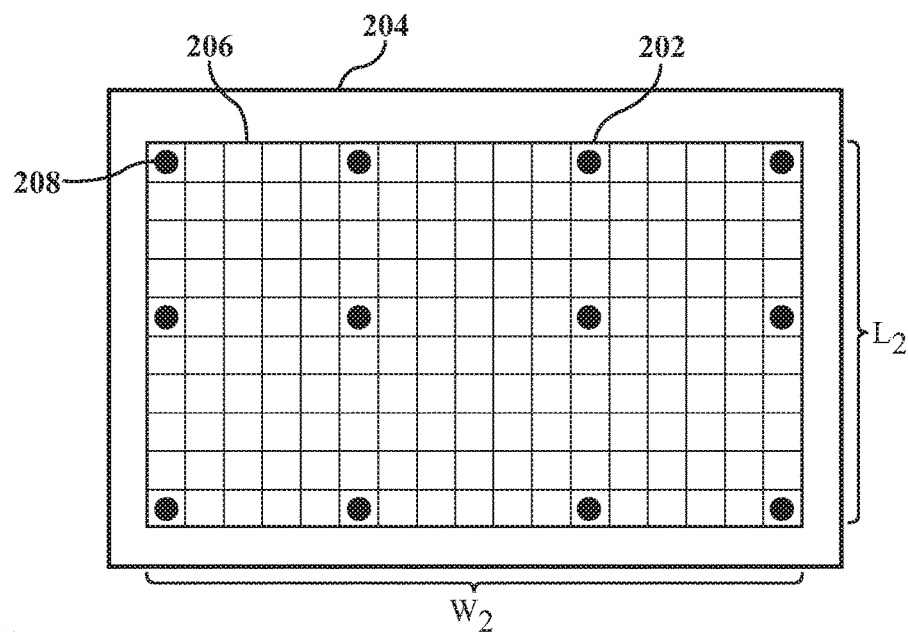
FIG. 8B is an exaggerated view taken long line 8B in FIG. 7 used to illustrate the relative sizes of pixels of projected pixels of solidification energy and the supports of a photohardening inhibitor delivery device.

Referring to FIG. 8A, the DMD micro-mirror array 202 is defined by an array of selectively activatable micromirrors arranged in rows and columns. Each micromirror corresponds to one projected pixel of light. A controller selectively activates the micro-mirrors 202 (FIG. 8A) based on the cross-sectional shape of the three-dimensional object that corresponds to the current layer of the object 24 being built. The activated mirrors reflect electromagnetic energy (e.g., visible light, UV light, or IR light) to a corresponding x, y location on the photohardenable material's energy-incident surface 29. In certain examples, the micro-mirrors 202 are selectively activatable to provide projected pixels having gray scale values and can thus provide a solidification energy intensity between full intensity (100) and minimum intensity (0), which may not be zero intensity, but rather, a non-zero intensity that is insufficient to solidify the photohardenable material 25).

Certain suppliers of DLPs provide a "throw ratio" but do not provide the focal length. The "throw ratio" (T) is a dimensionless ratio of the distance along the build (z) axis from the center of the objective lens pupil to the energy incident surface 29 of the photohardenable material 25 divided by the width of the image on the energy-incident surface 29.

$$T=D/W \quad (1)$$

where,
D=distance from lens pupil to energy-incident photohardenable material surface 29 along the build (z) axis (mm); and
W=width of projected image on energy-incident photohardenable material surface 29 (mm) along the x-axis.

If the width of the DMD is known, the distance from the DMD to the lens pupil along the build (z) axis may be calculated as follows:

$$d_1 = T \times w \quad (2)$$

where, $d_1$ is the distance from the DMD to the lens pupil along the build (z) axis (mm);

T is the throw ratio (dimensionless); and w=the width of the DMD mirror array along the x-axis.

The focal length f may then be calculated as follows:

$$f = (1/d_1 + 1/D)^{-1} \quad (3)$$

where, f is the focal length (mm), and $d_1$ and D are as defined in equations (1) and (2).

The absolute value magnification of the DLP may be determined as follows:

$$M = D/d_1 = W/w \quad (4)$$

where

M is the magnification (dimensionless), and D, W, w, and $d_1$ are as defined in equations (1)-(3).

Figure 8C:
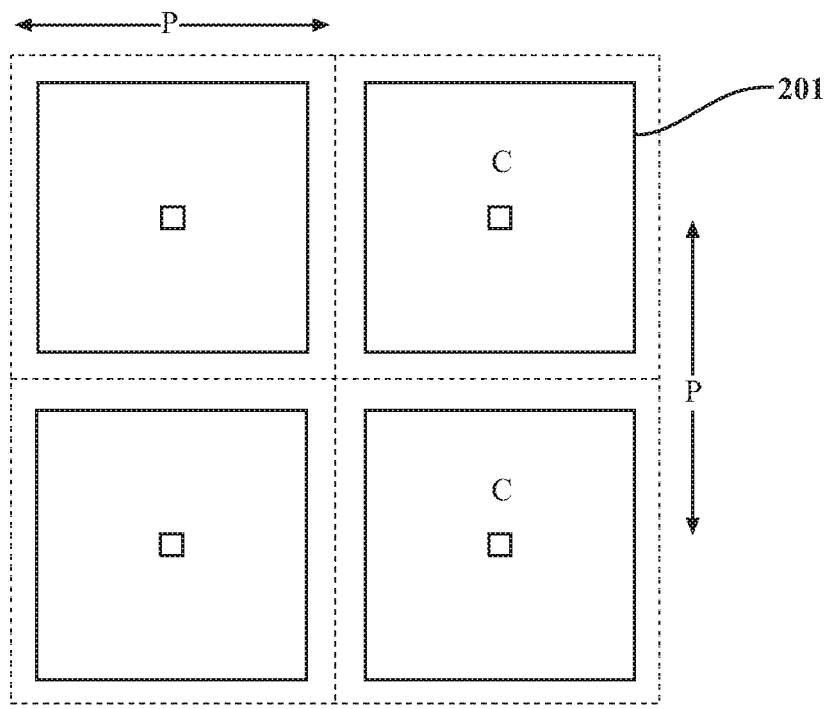
FIG. 8C is an exaggerated view of four (4) DMD micromirrors from a DMD micro-mirror array component of a digital light projector (DLP)
Figure 8D:
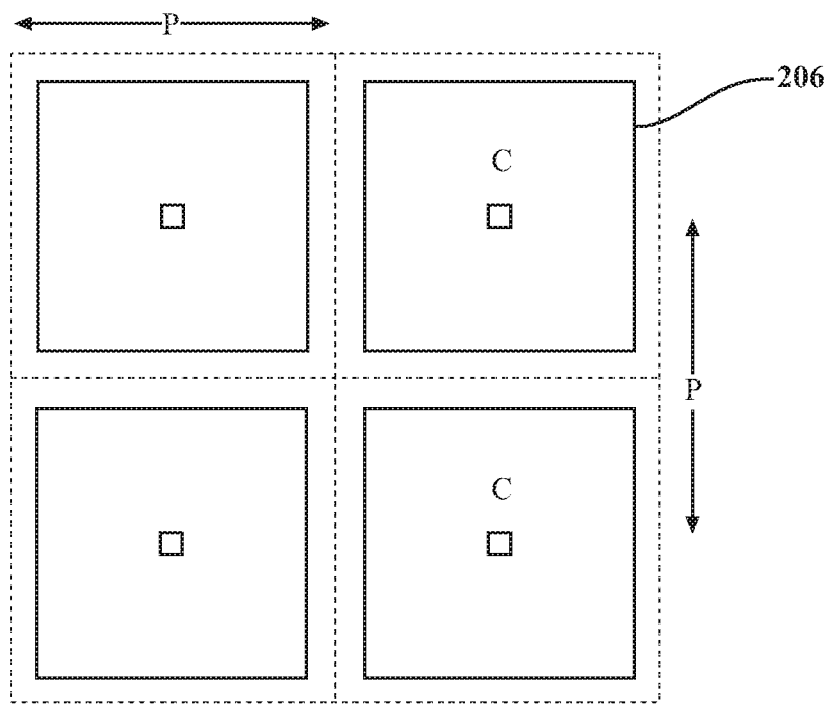
FIG. 8D is an exaggerated view of four (4) projected pixels generated by a DLP using the DMD micro-mirrors of FIG. 8C.

Referring to FIGS. 8C and 8D, in an example where the DMD mirror array has an x-axis width of 10 mm, and a mirror pitch p of 10 microns, if the projected width of the build area along the x-axis is 1000 microns, the magnification M will be 1000 microns/10 microns=100. Thus, the projected pixel pitch will be 1000 microns=1 mm. As used herein, the "projected pixel area" refers to the projected pixel area calculated from the pitch (i.e., Area=$P^2$). Thus, in this example, for purposes of preventing the supports 74 from causing an imprint to form in the three-dimensional object, the preferred support 74 cross-sectional area would be less than 1 mm², preferably less than 0.9 mm², more preferably less than 0.8 mm², and still more preferably less than 0.6 mm². In this example, for purposes of preventing the supports from causing an imprint to form in the three-dimensional object, the preferred support diameters would be less than 1 mm, preferably less than 0.9 mm, more preferably less than 0.8 mm, and still more preferably less than 0.6 mm.

In accordance with another aspect of the present disclosure, a method is provided for making a three-dimensional object in which the build platform velocity is varied to protect the object 24 from damage due to vacuum forces at the depletion zone 23. The method is particularly useful for dealing with vacuum forces resisting the upward movement of the build platform 26 due to the depletion zone 23. The method may be used with or without the apparatus features of FIGS. 8A and 8B. However, in preferred examples, the supports 74 are configured as described and depicted in FIGS. 8A and 8B. It has been found that vacuum forces generated by the depletion zone 23 pose a greater risk of causing the object 24 to separate from the build platform 26 during the formation of an initial build axis (z) section of object 24 relative to a subsequent build axis (z) section of object 24. Accordingly, in the method of FIG. 9, the speed at which the build platform 26 moves away from the inhibitor delivery device 44 and the non-solidification zone 41 following the solidification of a layer of photohardenable material 25 is reduced during the formation of the initial build (z) axis section of the object 24 relative to the subsequent build (z) axis section of the object 24.

In one example, the initial build axis (z) section of the object is defined by numbers of object layers. In accordance with the example, the initial number of layers is from two to ten layers, preferably from three to seven layers, and more preferably from four to six layers. In one example, the initial number of layers is five. The subsequent build (z) axis section comprises the number of layers of the object.

In accordance with another example, the initial build (z) axis section of the object is defined by a height along the build (z) axis, and the height is from 150 microns to 600 microns, preferably from 200 microns to 550 microns, and more preferably from 250 microns to 500 microns. The subsequent build (z) axis section comprises the remaining object height along the build (z) axis.

During the formation of the initial build (z) axis section of the object 24—and following the solidification of a layer of photohardenable material—the build platform velocity in a direction away from the inhibitor delivery device 44 and non-solidification zone 41 is no more than seventy percent of the build platform velocity in a direction away from the inhibitor delivery device 44 and non-solidification zone 41 following the solidification of a layer of photohardenable material during the formation of the subsequent build (z) axis sections of the object. Preferred and more preferred velocities during the formation of the initial build (z) axis section are 60 and 50 percent, respectively, of the velocities during the formation of the subsequent build (z) axis section. The velocity may vary during the formation of the initial and/or subsequent build (z) axis section, and in certain examples, the velocity during the formation of any part of the initial build (z) axis section is not more than 70 percent, preferably no more than 60 percent, and still more preferably no more than 50 percent of the velocity during the formation of each and every part of the subsequent build (z) axis section. In other examples, the velocity during any part of the initial build (z) axis section of the object is not more than 70 percent, preferably no more than 60 percent, and still more preferably no more than 50 percent of the velocity during the formation of any part of each and every subsequent build (z) axis section. In further examples, the velocity during every part of the initial build (z) section is not more than 70 percent, preferably no more than 60 percent, and still more preferably no more than 50 percent of the velocity during the formation of any part of the subsequent build (z) axis sections. In still other examples, the velocity during the formation of every part of the initial build (z) section is not more than 70 percent, preferably no more than 60 percent, and still more preferably no more than 50 percent of the velocity during the formation of each and every part of the subsequent build (z) axis section.

Figure 9:
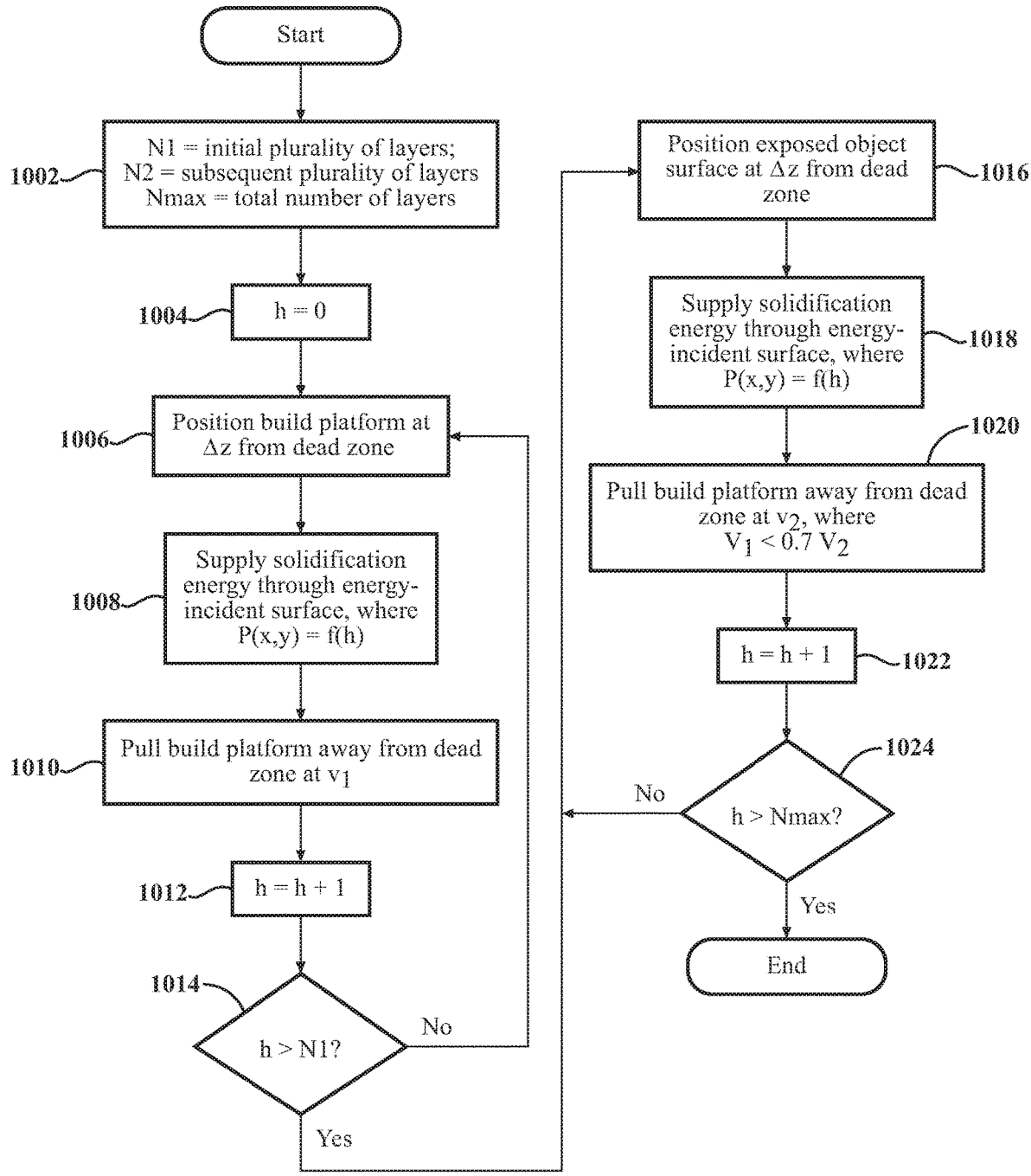
FIG. 9 is a flow diagram illustrating an exemplary method of making a three-dimensional object in which the build platform speed is varied between an initial build axis object section and a subsequent build axis object section.

Referring to FIG. 9, an exemplary method of varying the velocity of the build platform 26 is depicted. In step 1002 the variable N1 is set to an initial plurality of layers out of the total number of layers Nmax comprising the object 24. The variable N2 is set to the subsequent number of layers comprising object 24. Thus, Nmax is the sum of N1 and N2. The method of FIG. 9 is a discontinuous method in which the build platform stops moving when solidification energy is supplied to form the object 24. However, similar velocity variations may be used with methods in which the build platform movement is wholly or partially continuous.

In step 1004 the layer index h is initialized to zero. The build platform 26 is positioned with the bottom facing surface (see FIG. 7) spaced apart from the non-solidification zone 41 by an object layer thickness Δz (step 1006). As with the preceding examples and embodiments, solidification energy in the non-solidification zone 41 will not cause the photohardenable material 25 in the non-solidification zone 41 to solidify due to the presence of a photohardening inhibitor.

In step 1008 solidification energy is supplied through the photohardening inhibitor delivery device reservoir base 73, continuous chamber 78, and the at least one film 46 to the energy incident surface 29 of photohardenable material 25. Solidification energy also passes through supports 74, but with some diminution and distortion due to the differing indices of refraction of supports 74 and the inhibitor. The pattern of solidification energy P(x,y) is a function of the particular layer being formed as indicated by the value of the layer index h. In certain examples, the first layer and some or all of the initial plurality of layers N1 are removable supports attached to the build platform 26, which facilitate removal of the finished object from the build platform 26.

Following the solidification of the first layer, the build platform 26 is moved away from the inhibitor delivery device 44 and the non-solidification zone 41 at a velocity $v_1$. Velocity $v_1$ is preferably selected to prevent the newly formed layers of object 24 from separating from build platform 26 due to the vacuum forces arising from the depletion zone 23, as well as to prevent damaging the at least one film 46 and/or supports 74.

In preferred examples, in step 1010 the build platform 26 initially moves away from inhibitor delivery device 44 and non-solidification zone 41 by more than one layer thickness $\Delta z$, which better allows solidifiable material 25 to fill the depletion zone 23. In step 1012 the layer index is incremented by one. In step 1014 the layer index is compared to the number of layers N1 in the initial plurality of layers. If the layer index is not greater than N1, control is transferred to step 1006 to continue to form the initial build (z) axis section of object 24 by moving the build platform 26 downward until the exposed object surface 27 is one layer thickness ($\Delta z$) from non-solidification zone 41. The build (z) axis height of the non-solidification zone 41 may be controlled in the manner described previously.

If the layer index is greater than N1 in step 1014, control is transferred to step 1016 to begin forming the subsequent build (z) axis section of object 24. In step 1016 the build platform is positioned such that the exposed surface 27 (FIG. 1) of the object 24 is spaced apart from the non-solidification zone by a layer thickness $\Delta z$. In certain examples, following the last iteration of step 1010, the exposed surface 27 of the object 24 (in its partially formed state) will be spaced apart from non-solidification zone 41 by more than a layer thickness. In such cases, the build platform 26 is moved downward until the exposed surface is spaced apart from the non-solidification zone 41 by a single layer thickness $\Delta z$.

Solidification energy is supplied through the inhibitor delivery device 44 and at least one film 46 to the energy-incident surface 29 of the photohardenable material 25 in step 1018. The pattern P(x,y) of the solidification energy is determined by the current value of the layer index h.

In step 1020 the build platform 26 is moved away from the inhibitor delivery device 44 and non-solidification zone 41 at a velocity $v_2$ that is greater than the velocity $v_1$ of step 1010. In step 1010 $v_1$ is 70 percent of $v_2$, or equivalently, $v_2$ is 1.43 times $v_1$. In preferred examples, the build platform 26 is initially pulled away from the non-solidification zone 41 and inhibitor delivery device 44 by more than a layer thickness, and in preferred examples, it is initially pulled away by a distance along the build (z) axis that ensures the vacuum forces resisting the movement of the build platform are zero. Because the initial build (z) axis section of the object 24 has already been formed, the partially-formed object 24 has more structural integrity in step 1020 than in step 1010, and thus, the build platform 26 may be pulled away from non-solidification zone 41 and inhibitor delivery device 44 at a faster speed in step 1020 than in step 1010 without damaging object 24.

The layer index h is incremented in step 1022. If the layer index h exceeds the total number of object layers Nmax, the method ends. Otherwise, control transfers to step 1016 to form another layer.

In accordance with another aspect of the present disclosure, the velocity at which the build platform 26 is pulled away from the non-solidification zone 41 and inhibitor delivery device 44 after solidifying a layer of photohardenable material 25 is based on the force exerted on the build platform 26 due to the development of a sub-atmospheric pressure $P_{Sub\ atm}$ in depletion zone 23. At the same time, the velocity is preferably based on the nature of the material. In general, thicker, more viscous materials will require a lower velocity to prevent damaging the object 24, at least one film 48, and supports 74.

In one example, a force sensor or a pressure sensor is operatively connected to build platform 26 to sense the force resisting the upward movement of the build (z) platform 26 in a direction along the build (z) axis away from inhibitor delivery device 44 and non-solidification zone 41. If a pressure sensor is used, the pressure reading may be converted to force based on the area of the pressure detection. In certain examples, the force or pressure sensor measures a change in force or pressure because the force attributable to the depletion zone 23 will be dynamic and will vary as the solidifiable material 25 is taken from or fills in the depletion zone 23. Following the formation of a given layer, the object 24 should exert a substantially constant downward force on the build platform 26. Thus, a change in force exerted on the build platform 26 will reliably indicate whether vacuum forces are exerted on the build platform 26.

In accordance with one method, when the downward force or pressure (or the change in either value) reaches zero, the depletion zone 23 is considered no longer to be depleted. Thus, either at that time or following a slight additional upward movement, the build platform 26 is moved downward until the exposed object surface 27 is spaced apart from the non-solidification zone 41 by a layer thickness $\Delta z$. This process will typically squeeze out excess photohardenable material 25 from the location between exposed object surface 27 and non-solidification zone 41.

In accordance with the same method or in a different method, the velocity at which the build platform 26 moves away from inhibitor delivery device 44 and non-solidification zone 41 is dependent on the nature of the solidifiable material 25. In preferred examples, a controller is provided and is operatively connected to a database comprising material identifiers and velocity coefficients. Based on a material identifier read by the controller, a velocity coefficient is selected and is used to calculate a desired upward build platform velocity.

Figure 10:
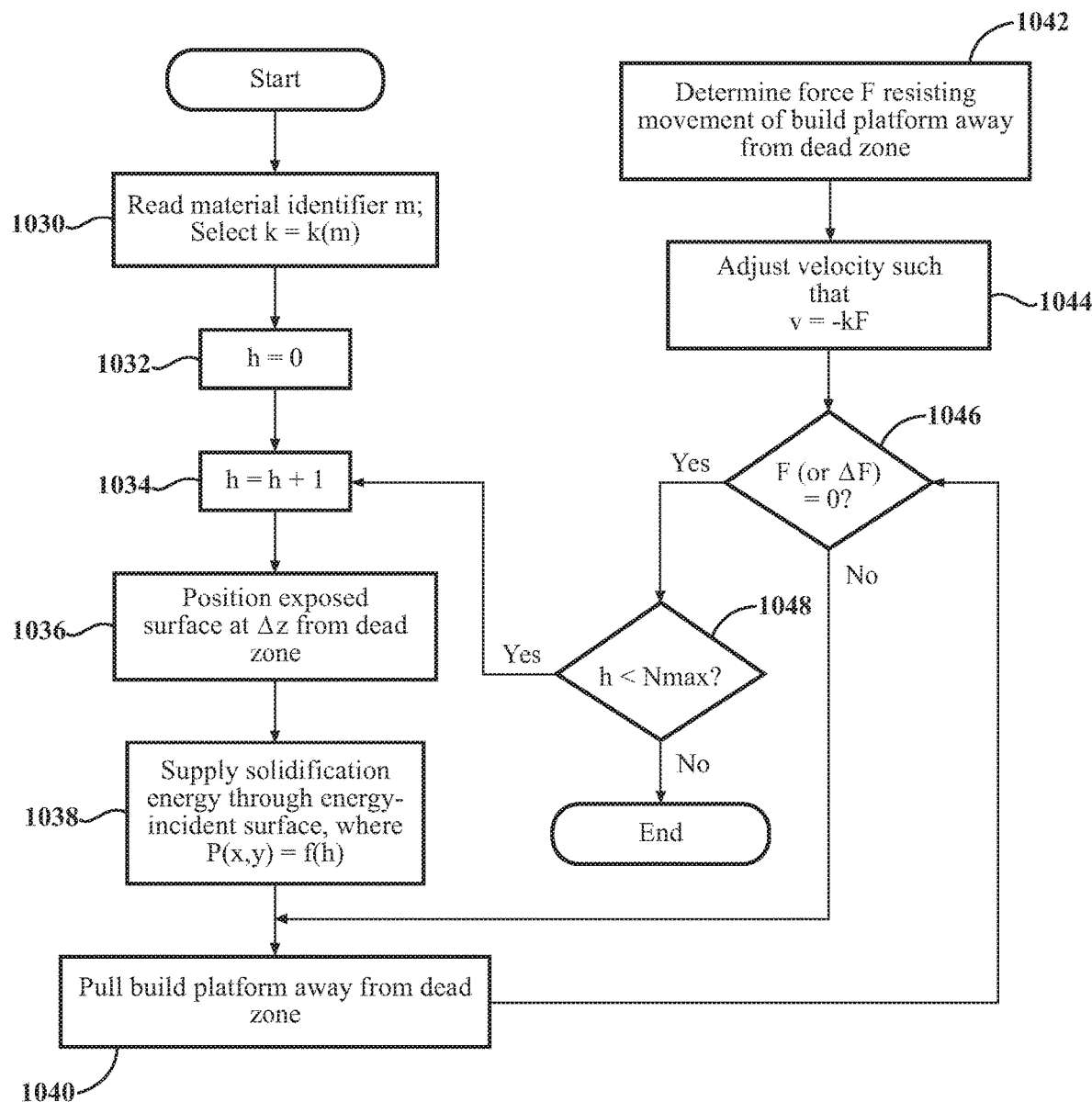
FIG. 10 is a flow diagram illustrating an exemplary method of making a three-dimensional object in which the build platform speed is varied based on a sensed force of resistance exerted on the build platform when it is moved away from the zone of non-solidification.

Referring to FIG. 10, an exemplary implementation of the foregoing method is described. In step 1030 a material identifier m is read. In certain examples, a container of the photohardenable material will have a scannable identifier, such as an RFID code, that can be read by a controller to identify the photohardenable material 25. The controller then queries a database that correlates material identifiers to velocity coefficients, k=k(m) to select an appropriate coefficient.

In step 1032 the layer index h is initialized to zero. The index h is then incremented by one in step 1034. The exposed object surface 27 (or exposed build platform 26 surface when h=1) is positioned in the photohardenable material at one layer thickness Δz from the non-solidification zone 41 (step 1036). In step 1038 solidification energy is supplied through the inhibitor delivery device 44, the at least one film 46 and to the energy-incident surface 29 of the photohardenable material. The solidification energy is supplied in a pattern that varies with the position in the x, y plane and which depends on the value of h (i.e., depends on the layer being formed). Thus, P(x,y)=f(h).

Following the solidification operation in step 1038, the build platform 26 is pulled upward and away from inhibitor delivery device 44 and non-solidification zone 41 along the build (z) axis. The force F is sensed by the previously described sensor as the build platform is pulled upward. The build platform controller then adjusts the velocity based on the following relationship:

$$v = -k(m)F \qquad (5)$$

where
v=velocity of build platform upward movement (mm/sec)
k(m) is a material dependent velocity constant in mm/sec/N; and
F=force exerted against upward movement of build platform (N)

The negative sign reflects the opposite directions of the force vector (downward) and the velocity vector (upward). Although a linear correlation is used in equation (5), other types of relationships may be used including non-linear or discrete functions. In some cases, the nature of the material may be such that using a velocity that is independent of the force sensor reading may be preferable.

In step 1044 a determination is made as to whether the force resisting upward movement of build platform 26 has dropped to zero. Depending on how the force sensor is placed and calibrated, the change in force (ΔF) of the sensor may be used. Step 1044 is used to indicate when the vacuum forces from the depletion zone 23 have subsided. When the net force on the build platform stops changing, it is a reliable indication that the vacuum forces have subsided because solidifiable material 25 has filled the depletion zone 23. However, because the object 24 will exert some downward force on the build platform 26, it may be preferable to use the change in the force (or pressure) sensor value to indicate when the vacuum forces have been overcome.

If the force (or change in force) is zero in step 1046, control transfers to step 1048. The layer index h is compared to the maximum number of layers Nmax in step 1048. If the maximum number of layers has been completed, the method ends. Otherwise, control transfers to step 1034 to complete another layer. If in step 1046 the force (or change in force) has not reached zero, control transfers to step 1040 and the upward (away from non-solidification zone 41 and inhibitor delivery device 44) movement of build platform 26 is continued.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their r equivalents, rather than by the preceding description.

What is claimed is:

1. An apparatus for making a three-dimensional object from a photohardenable material, the apparatus comprising:
a photohardenable material container comprising a photohardenable material enclosure attached to a photohardening inhibitor delivery device, wherein the photohardenable material container comprises an open top defined by the photohardenable material enclosure and a closed bottom defined by the photohardening inhibitor delivery device, the closed bottom defines an energy-incident surface of photohardenable material held in the photohardenable material container, and the photohardening inhibitor delivery device comprises a photohardening inhibitor reservoir defining a photohardening inhibitor chamber having an open top and a plurality of supports, wherein the photohardening inhibitor delivery device further comprises at least one film that is permeable to the photohardening inhibitor, and wherein the at least one film is attached to each of the plurality of supports and encloses the open top of the photohardening inhibitor chamber, and each of the supports has a cross-sectional area of less than 1 mm$^2$;
a build platform movable along a build axis; and
a solidification energy source spaced apart from the at least one film along the build axis, wherein the solidification energy source is activatable to selectively project a plurality of pixels of solidification energy onto the energy-incident surface of the photohardenable material through the photohardening inhibitor delivery device, wherein the projected pixels each have an area, and the cross-sectional area of each of the supports is no more than 90 percent of the individual projected pixel areas, whereby the relative difference between the pixel and support areas reduces the likelihood of imprinting an image of the supports on the three-dimensional object being made.

2. The apparatus of claim 1, wherein the cross-sectional area of each of the supports is no more than 80 percent of the individual projected pixel areas.

3. The apparatus of claim 1, wherein the cross-sectional area of each of the supports is no more than 60 percent of the individual projected pixel areas.

4. The apparatus of claim 1, wherein the solidification energy source comprises a projector with an objective lens, the objective lens has a focal length, and the objective lens is spaced apart from the energy-incident surface by a distance that is substantially equal to the focal length along the build axis.

5. The apparatus of claim 4, wherein the solidification energy source comprises a micro-mirror array comprising a total number of micromirrors, and the solidification energy source is activatable to selectively project a maximum number of the pixels corresponding to the total number of micromirrors.

6. The apparatus of claim 5, wherein the micromirror array has an area, and the micromirror array area and the distance between the objective lens and the energy-incident surface along the build axis defines a maximum build area on the energy-incident surface of the photohardenable material.

7. The apparatus of claim 1, wherein each of the supports has a diameter that is less than a pitch of the plurality of pixels.

8. The apparatus of claim 7, wherein the diameter of each of the supports is no more than 90 percent of the pitch of the plurality of pixels.

9. The apparatus of claim 7, wherein the diameter of each of the supports is no more than 80 percent of the pitch of the plurality of pixels.

10. The apparatus of claim 7, wherein the diameter of each of the supports is no more than 60 percent of the pitch of the plurality of pixels.

11. The apparatus of claim 1, wherein each of the supports has a height, and the ratio of the height to the cross-sectional area for each of the supports is no more than $0.1\mu^{-1}$.

12. The apparatus of claim 1, wherein the supports each have a diameter, and a ratio of the height to the diameter of each of the supports is no more than five.

13. The apparatus of claim 1, further comprising a controller operatively connected to the build platform to move the build platform along the build axis, and a force sensor operatively connected to the build platform to sense a resisting force when the build platform is pulled away from the photohardening inhibitor reservoir along the build axis, wherein during an object build operation, the controller is configured to decrease a velocity of the build platform moving in a direction away from the photohardening inhibitor reservoir along the build axis when the force sensor senses an increase in the resisting force.

14. The apparatus of claim 13, wherein the controller is configured to decrease the velocity of the build platform in accordance with a linear relationship when the force sensor senses an increase in the resisting force.

15. The apparatus of claim 14, wherein the controller determines the linear relationship based on a photohardenable material identifier.

16. The apparatus of claim 1, further comprising a controller operatively connected to the build platform and configured to move the build platform at a first velocity in a direction away from the photohardening inhibitor along the build axis during formation of an initial number of layers of the three-dimensional object and at a second velocity in the direction away from the photohardening inhibitor reservoir along the build axis during formation of a subsequent number of layers of the three-dimensional object, and the first velocity is less than the second velocity.

17. The apparatus of claim 16, wherein the initial number of object layers is no more than ten (10) layers, and the first velocity is no more than seventy percent of the second velocity.

18. The apparatus of claim 1, wherein the chamber is a continuous chamber having a total area and an open area not occupied by any of the supports, wherein the open area is 50-99 percent of the total area.

19. The apparatus of claim 1, wherein the at least one film comprises an elastomeric film.

20. The apparatus of claim 1, wherein the at least one film comprises a polydimethylsiloxane (PDMS) film.

21. The apparatus of claim 20, wherein the at least one film further comprises a fluoropolymer film positioned on top of the PDMS film.

22. The apparatus of claim 21, wherein the fluoropolymer film is not fixed to the PDMS film.

23. The apparatus of claim 1, wherein the at least one film comprises a fluoropolymer film.

24. The apparatus of claim 1, wherein the at least one film is a surface fluorinated polydimethylsiloxane (PDMS) film.

25. The apparatus of claim 1, wherein the photohardening inhibitor reservoir is formed from a polydimethylsiloxane (PDMS).

26. The apparatus of claim 1, wherein the supports each have a height along a height axis, and each of the supports is spaced apart from its nearest neighboring supports along a length axis and a width axis, thereby defining a plurality of open rows having lengths along the length axis and columns having lengths along the width axis.

27. The apparatus of claim 1, wherein each of the supports has a diameter ranging from about 25 microns to about 250 microns.

28. The apparatus of claim 1, wherein each of the supports is spaced apart from its nearest neighboring supports by a distance of from about 80 microns to about 200 microns.

29. The apparatus of claim 1, wherein the reservoir comprises a plurality of side walls, the chamber is continuous, and the sidewalls define the boundary of the continuous chamber.

30. A method of determining if the photohardening inhibitor chamber of the apparatus of claim 1 is damaged, the method comprising:
   pressurizing the photohardening inhibitor reservoir to a first pressure with a gas;
   placing a downstream side of the photohardening inhibitor reservoir in fluid communication with an inhibitor destination, the inhibitor destination being held at a second pressure less than the first pressure;
   measuring a third pressure on an upstream side of the photohardening inhibitor reservoir after placing the downstream side of the photohardening inhibitor reservoir in fluid communication with the inhibitor destination; and
   replacing the photohardenable material container with another photohardenable material container if the difference between the third pressure and the second pressure is no more than 60 percent of the difference between the first pressure and the second pressure.

* * * * *

UNITED STATES PATENT AND TRADEMARK OFFICE
CERTIFICATE OF CORRECTION

PATENT NO. : 11,220,054 B2  
APPLICATION NO. : 16/417027  
DATED : January 11, 2022  
INVENTOR(S) : El-Siblani et al.

Page 1 of 1

It is certified that error appears in the above-identified patent and that said Letters Patent is hereby corrected as shown below:

In the Specification

Column 5, Line 59, between "is" and "than" delete "less" and add --greater--

Signed and Sealed this  
Fifteenth Day of February, 2022

Drew Hirshfeld  
*Performing the Functions and Duties of the  
Under Secretary of Commerce for Intellectual Property and  
Director of the United States Patent and Trademark Office*